(12) United States Patent
Son et al.

(10) Patent No.: US 9,696,963 B2
(45) Date of Patent: Jul. 4, 2017

(54) MOBILE TERMINAL AND CONTROLLING METHOD THEREOF

(71) Applicant: LG ELECTRONICS INC., Seoul (KR)

(72) Inventors: Jiyen Son, Seoul (KR); Sangwoon Lee, Seoul (KR); Byungchul Gil, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/948,444

(22) Filed: Nov. 23, 2015

(65) Prior Publication Data

US 2016/0154624 A1  Jun. 2, 2016

(30) Foreign Application Priority Data

Dec. 1, 2014 (KR) .......................... 10-2014-0169548

(51) Int. Cl.

| | |
|---|---|
| H04M 1/725 | (2006.01) |
| G10L 15/22 | (2006.01) |
| G10L 15/26 | (2006.01) |
| G06F 3/16 | (2006.01) |
| H04B 1/3827 | (2015.01) |
| H04W 4/00 | (2009.01) |
| G06F 3/041 | (2006.01) |
| G06F 3/01 | (2006.01) |

(52) U.S. Cl.
CPC ............. *G06F 3/167* (2013.01); *G06F 3/017* (2013.01); *G06F 3/0416* (2013.01); *H04B 1/385* (2013.01); *H04M 1/7253* (2013.01); *H04M 1/72569* (2013.01); *H04W 4/008* (2013.01); *G10L 15/26* (2013.01); *G10L 2015/223* (2013.01)

(58) Field of Classification Search
CPC ....... G06F 3/167; G06F 3/0484; G06F 3/0488
See application file for complete search history.

(56) References Cited

U.S. PATENT DOCUMENTS

| | | | |
|---|---|---|---|
| 6,556,222 | B1 | 4/2003 | Narayanaswami |
| 9,100,493 | B1 * | 8/2015 | Zhou ................ H04M 1/72522 |
| 2007/0112571 | A1 | 5/2007 | Thirugnana |

(Continued)

OTHER PUBLICATIONS

International Search Report dated Mar. 16, 2016 issued in Application No. PCT/KR2015/012395.

*Primary Examiner* — Matthew Baker
(74) *Attorney, Agent, or Firm* — Ked & Associates, LLP

(57) ABSTRACT

A watch type mobile terminal and controlling method thereof are disclosed, by which the watch type mobile terminal can be controlled through voice. The present disclosure includes a touch input unit configured to receive a touch input, a wireless communication unit configured to perform a wireless communication, a sensing unit configured to sense a movement of the mobile terminal, a microphone configured to receive a sound, and a controller is configured to activate the microphone when a preset first gesture input is detected, if a user voice is received via the microphone while the touch input unit is touched, control data to be transmitted to a target indicated by the user voice, and if the user voice is received via the microphone while the touch input unit is not touched, control a function indicated by the user voice to be executed on the mobile terminal.

20 Claims, 28 Drawing Sheets

(56) References Cited

U.S. PATENT DOCUMENTS

2014/0045463 A1    2/2014   Hsieh et al.
2014/0222436 A1    8/2014   Binder et al.
2014/0278420 A1    9/2014   Meloney et al.
2016/0225371 A1*   8/2016   Agrawal ............. G06F 3/04842

* cited by examiner

FIG. 17
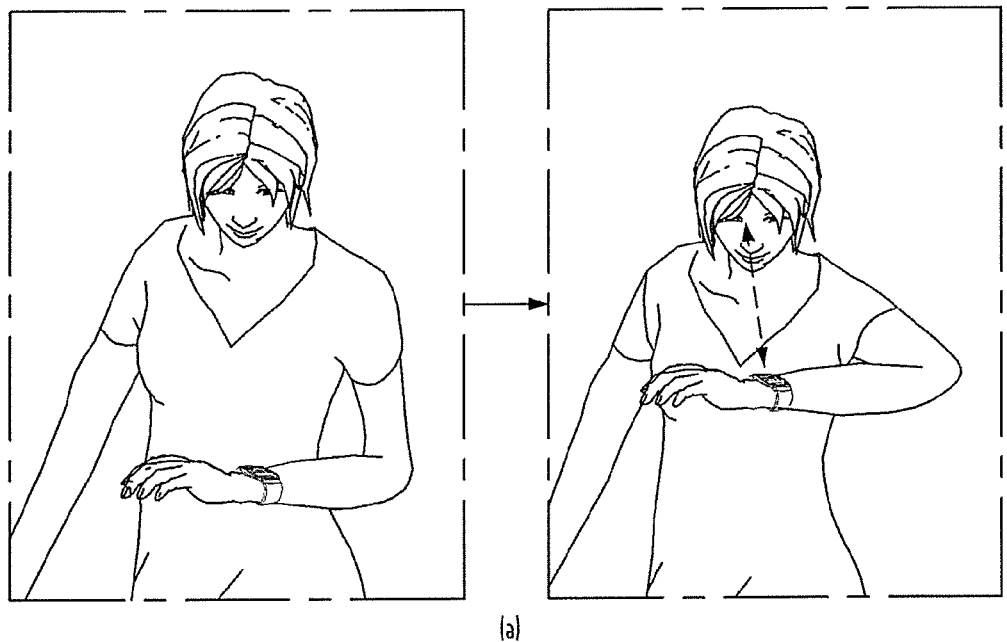
(a)
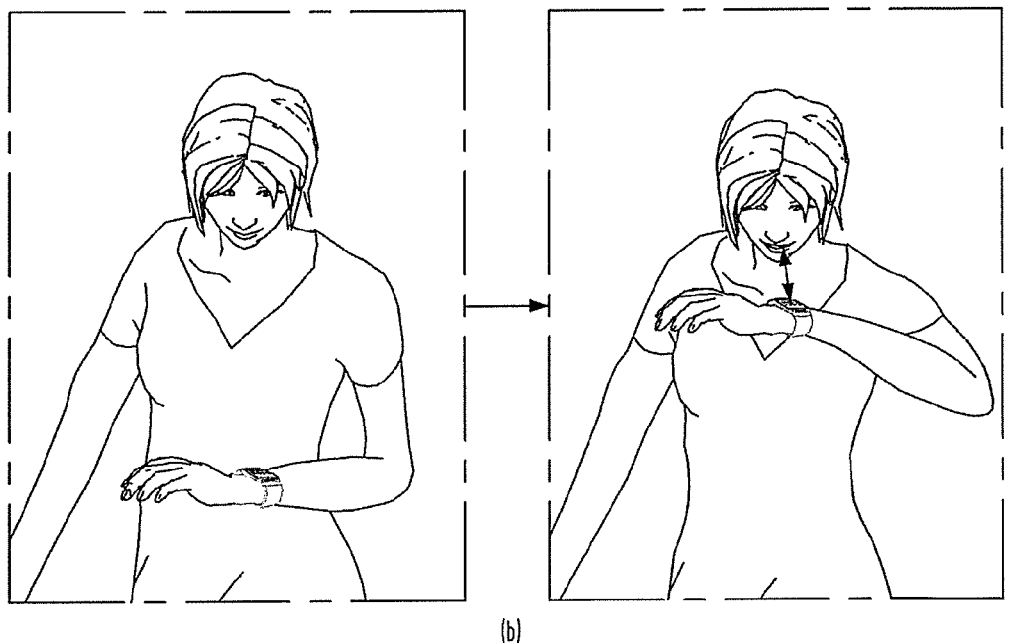
(b)

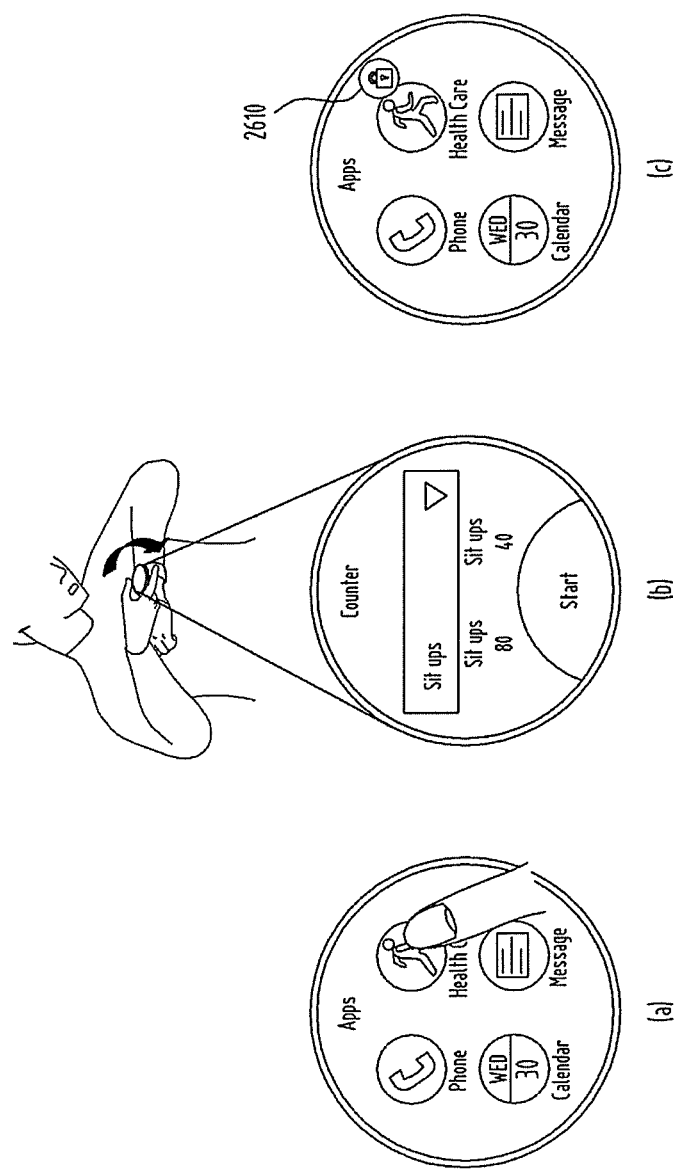

MOBILE TERMINAL AND CONTROLLING METHOD THEREOF

CROSS-REFERENCE TO RELATED APPLICATION(S)

This application claims priority under 35 U.S.C. §119 to Korean Application No. 10-2014-0169548 filed on Dec. 1, 2014, whose entire disclosure is hereby incorporated by reference

BACKGROUND

1. Field

The present disclosure relates to a mobile terminal, and more particularly, to a watch type mobile terminal and controlling method thereof. Although the present disclosure is suitable for a wide scope of applications, it is particularly suitable for controlling the watch type mobile terminal through voice.

2. Background

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive multicast signals which permit viewing of content such as videos and television programs.

As functions of the terminal are getting diversified, the terminal tends to be implemented as a multimedia player provided with complex functions such as photographing of photos or videos, playback of music or video files, game play, broadcast reception and the like for example.

To further increase portability of a mobile terminal, many ongoing efforts are mode to research and develop a mobile terminal of a type wearable on a wrist like a watch. Unlike the typical mobile terminals, a mobile terminal of a wearable type is advantageous in being always carried on a user's body. It is inconvenient for a user to take out a mobile terminal of a traditional bar or folder type from a pocket or bag if necessary. Yet, since a wearable device can be always carried on a user's body, it is advantageous in that the user can check contents of the mobile terminal at any time.

However, since a watch type terminal has a small display unit, it is difficult to employ the same text input system for a device (e.g., a smartphone, a tablet PC, etc.) provided with a touchscreen according to a related art. For instance, although a text is inputted by a user's touch input to a virtual keypad displayed on such a related art device as a smartphone, a tablet PC, or the like, a watch type terminal has difficulty in completely displaying a virtual keypad due to a small size of a display unit.

Thus, a manipulation through voice may be more useful for a watch type terminal than a manipulation through a touch. Accordingly, the present disclosure intends to propose a method of manipulating a watch type terminal through voice.

The above references are incorporated by reference herein where appropriate for appropriate teachings of additional or alternative details, features and/or technical background.

BRIEF DESCRIPTION OF THE DRAWINGS

The present disclosure will become more fully understood from the detailed description given herein below and the accompanying drawings, which are given by illustration only, and thus are not limitative of the present disclosure, and wherein:

FIG. 17 is a diagram for one example of determining whether to output a text converting from a user voice by STT depending on a distance between a user and a mobile terminal;

FIG. 26 is a diagram for one example of locking a specific application.

DETAILED DESCRIPTION

Figure 1A:
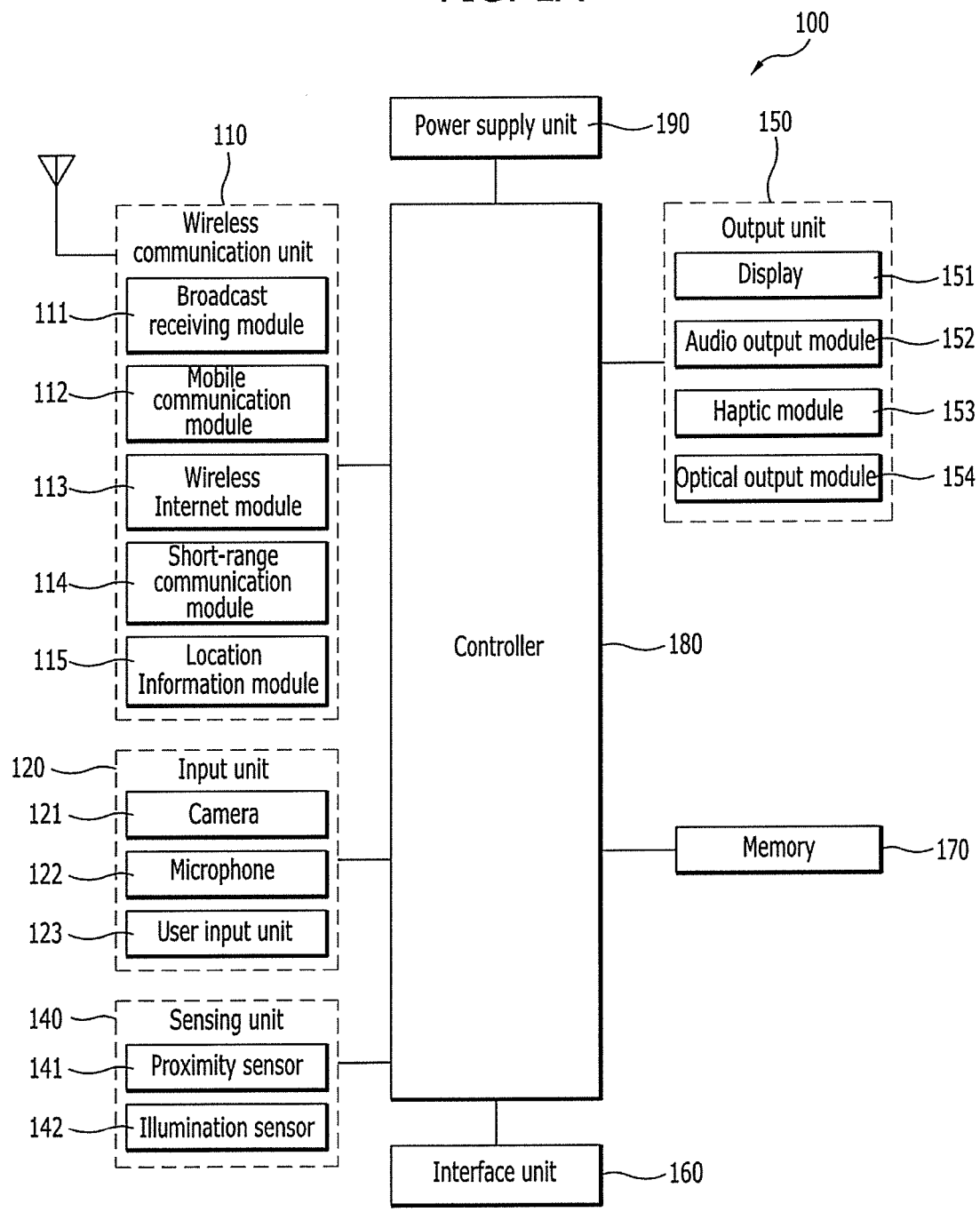
FIG. 1A is a block diagram of a mobile terminal in accordance with the present disclosure.

Accordingly, embodiments of the present disclosure are directed to a mobile terminal and controlling method thereof that substantially obviate one or more problems due to limitations and disadvantages of the related art.

The present disclosure is devised for the aforementioned necessity, and an object of the present disclosure is to provide a mobile terminal and controlling method thereof, by which user's convenience is enhanced.

In particular, one object of the present disclosure is to provide a watch type mobile terminal and controlling method thereof, by which the watch type mobile terminal can be controlled through voice.

Another object of the present disclosure is to provide a mobile terminal and controlling method thereof, by which a different function can be executed depending on whether a display unit is touched in case of inputting voice.

Technical tasks obtainable from the present disclosure are non-limited by the above-mentioned technical tasks. And, other unmentioned technical tasks can be clearly understood from the following description by those having ordinary skill in the technical field to which the present disclosure pertains.

Additional advantages, objects, and features of the disclosure will be set forth in the disclosure herein as well as the accompanying drawings. Such aspects may also be appreciated by those skilled in the art based on the disclosure herein.

To achieve these objects and other advantages and in accordance with the purpose of the disclosure, as embodied and broadly described herein, as embodied and broadly described herein, a watch type mobile terminal according to one embodiment of the present disclosure may include a touch input unit configured to receive a touch input, a wireless communication unit configured to perform a wireless communication, a sensing unit configured to sense a movement of the mobile terminal, a microphone configured to receive a sound, and a controller is configured to activate the microphone when a preset first gesture input is detected, if a user voice is received via the microphone while the touch input unit is touched, control data to be transmitted to a target indicated by the user voice, and if the user voice is received via the microphone while the touch input unit is not touched, control a function indicated by the user voice to be executed on the mobile terminal.

In another aspect of the present disclosure, as embodied and broadly described herein, a method of controlling a watch type mobile terminal according to another embodiment of the present disclosure may include activating a microphone when a preset first gesture input is detected, and receiving a user voice through the microphone, if the user voice is received while a touch input unit is touched, transmitting data indicated by the user voice to a target indicated by the user voice, and if the user voice is received while the touch input unit is not touched, executing a function indicated by the user voice.

Effects obtainable from the present disclosure may be non-limited by the above mentioned effect. And, other unmentioned effects can be clearly understood from the following description by those having ordinary skill in the technical field to which the present disclosure pertains.

It is to be understood that both the foregoing general description and the following detailed description of the present disclosure are exemplary and explanatory and are intended to provide further explanation of the disclosure as claimed.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
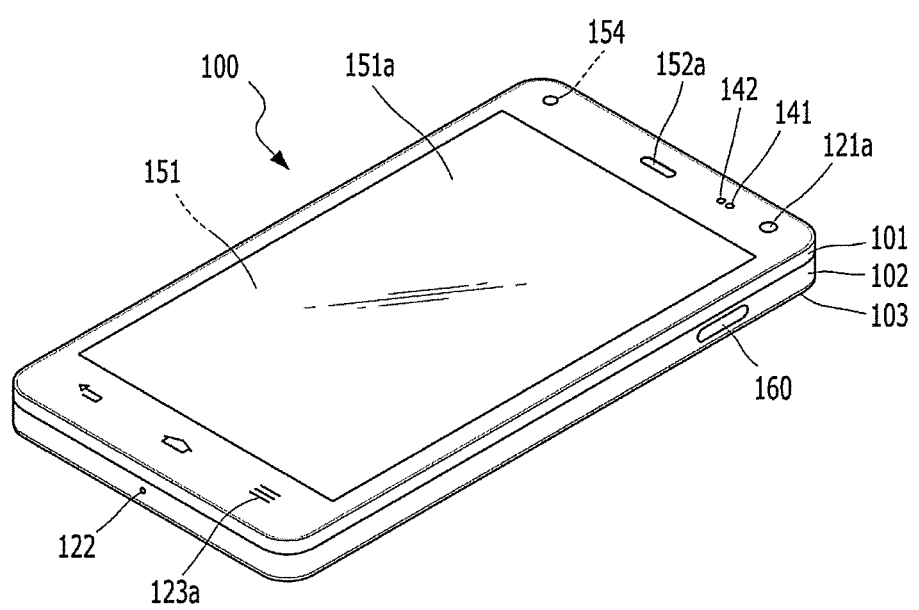
FIGS. 1B and 1C are conceptual views of one example of the mobile terminal, viewed from different directions.
Figure 1C:
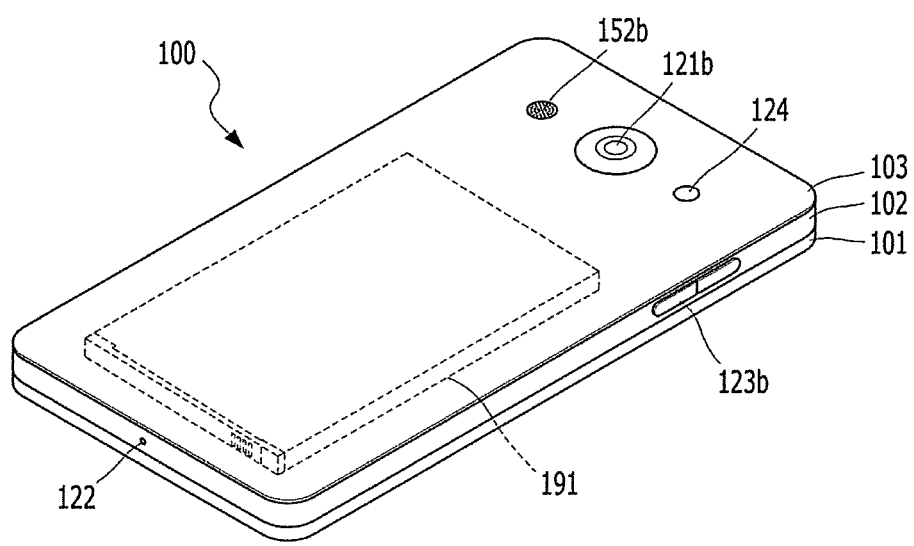

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123*a* and 123*b* are examples of the user input unit 123, which may be manipulated by a user to provide input to the mobile terminal 100. The first and second manipulation units 123*a* and 123*b* may also be commonly referred to as a manipulating portion, and may employ any tactile method that allows the user to perform manipulation such as touch, push, scroll, or the like. The first and second manipulation units 123*a* and 123*b* may also employ any non-tactile method that allows the user to perform manipulation such as proximity touch, hovering, or the like.

FIG. 1B illustrates the first manipulation unit 123*a* as a touch key, but possible alternatives include a mechanical key, a push key, a touch key, and combinations thereof.

Input received at the first and second manipulation units 123*a* and 123*b* may be used in various ways. For example, the first manipulation unit 123*a* may be used by the user to provide an input to a menu, home key, cancel, search, or the like, and the second manipulation unit 123*b* may be used by the user to provide an input to control a volume level being output from the first or second audio output modules 152*a* or 152*b*, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152*a* or 152*b*, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123*a* in the rear input unit. As such, in situations where the first manipulation unit 123*a* is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121*b* is shown located at the rear side of the terminal body and includes an image capturing direction that is substantially opposite to the image capturing direction of the first camera unit 121*a*. If desired, second camera 121*a* may alternatively be located at other locations, or made to be moveable, in order to have a different image capturing direction from that which is shown.

The second camera 121*b* can include a plurality of lenses arranged along at least one line. The plurality of lenses may also be arranged in a matrix configuration. The cameras may be referred to as an "array camera." When the second camera 121*b* is implemented as an array camera, images may be captured in various manners using the plurality of lenses and images with better qualities.

As shown in FIG. 1C, a flash 124 is shown adjacent to the second camera 121*b*. When an image of a subject is captured with the camera 121*b*, the flash 124 may illuminate the subject.

As shown in FIG. 1B, the second audio output module 152*b* can be located on the terminal body. The second audio output module 152*b* may implement stereophonic sound functions in conjunction with the first audio output module 152*a*, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Figure 2:
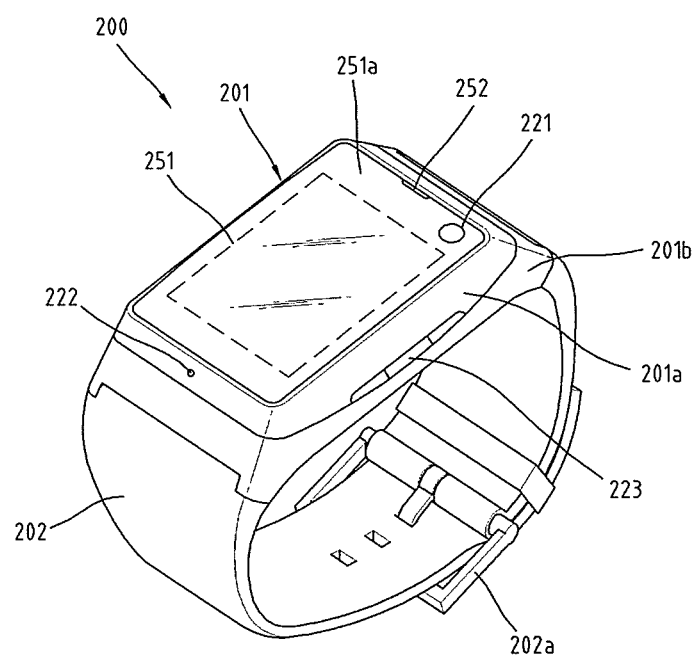
FIG. 2 is a perspective diagram for one example of a mobile terminal of a watch type related to another embodiment of the present disclosure.

FIG. 2 is a perspective view illustrating one example of a watch-type mobile terminal 200 in accordance with another exemplary embodiment. As illustrated in FIG. 2, the watch-type mobile terminal 200 includes a main body 201 with a display unit 251 and a band 202 connected to the main body 201 to be wearable on a wrist. In general, mobile terminal 200 may be configured to include features that are the same or similar to that of mobile terminal 100 of FIGS. 1A-1C.

The main body 201 may include a case having a certain appearance. As illustrated, the case may include a first case 201a and a second case 201b cooperatively defining an inner space for accommodating various electronic components. Other configurations are possible. For instance, a single case may alternatively be implemented, with such a case being configured to define the inner space, thereby implementing a mobile terminal 200 with a uni-body.

The watch-type mobile terminal 200 can perform wireless communication, and an antenna for the wireless communication can be installed in the main body 201. The antenna may extend its function using the case. For example, a case including a conductive material may be electrically connected to the antenna to extend a ground area or a radiation area.

The display unit 251 is shown located at the front side of the main body 201 so that displayed information is viewable to a user. In some embodiments, the display unit 251 includes a touch sensor so that the display unit can function as a touch screen. As illustrated, window 251a is positioned on the first case 201a to form a front surface of the terminal body together with the first case 201a.

The illustrated embodiment includes audio output module 252, a camera 221, a microphone 222, and a user input unit 223 positioned on the main body 201. When the display unit 251 is implemented as a touch screen, additional function keys may be minimized or eliminated. For example, when the touch screen is implemented, the user input unit 223 may be omitted.

The band 202 is commonly worn on the user's wrist and may be made of a flexible material for facilitating wearing of the device. As one example, the band 202 may be made of fur, rubber, silicon, synthetic resin, or the like. The band 202 may also be configured to be detachable from the main body 201. Accordingly, the band 202 may be replaceable with various types of bands according to a user's preference.

In one configuration, the band 202 may be used for extending the performance of the antenna. For example, the band may include therein a ground extending portion (not shown) electrically connected to the antenna to extend a ground area.

The band 202 may include fastener 202a. The fastener 202a may be implemented into a buckle type, a snap-fit hook structure, a Velcro® type, or the like, and include a flexible section or material. The drawing illustrates an example that the fastener 202a is implemented using a buckle.

Regarding a mobile terminal according to the present disclosure, it is intended to propose a new method for remotely controlling a mobile terminal of a watch type through a voice. Generally, in order to remotely control a mobile terminal using a voice, it is necessary to separately install an application for a voice input. Hence, in order to input a voice in the course of running a specific application, the running specific application is paused and a voice input application should be then launched. According to this, since a user experience is disconnected by an inter-application switch (i.e., stopping the running of the specific application and then launching the voice input application), it may cause a problem that the continuity of a mobile terminal use is disconnected. To solve such a problem, it is able to propose a method of applying a voice input through a voice platform disposed under an application layer.

Figure 3:
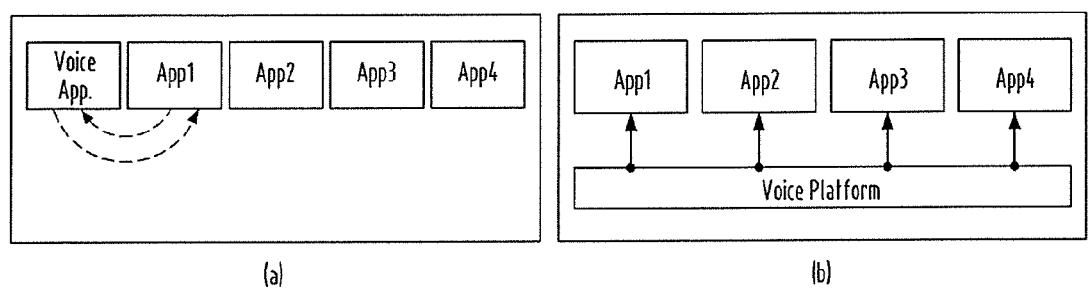
FIG. 3 is a schematic diagram for one example of embodying a voice input.

For instance, FIG. 3 is a schematic diagram for one example of embodying a voice input.

Referring to FIG. 3 (a), assuming that a voice input is accomplished by a voice input application on an application layer, if a user intends to input a voice in the course of running App 1, the running of App 1 is paused and the voice input application may be then launched. Hence, it may cause a problem that the continuity for App 1 cannot be maintained.

On the other hand, referring to FIG. 3 (b), if a voice input is implemented with a voice platform under the application layer, a voice can be inputted without interrupting the running of the application. For instance, while App 1 is running, if a user intends to input a voice, a voice input can be received by loading the voice input platform while continuing to run App 1.

Thus, if a voice input is implemented not on an application but on a platform, it is advantageous in securing the continuity of user experience. Assume that the mobile terminal according to the present disclosure described in the following is in a state of capable of performing a voice input using a voice platform like the example shown in FIG. 3 (b). In particular, assume that the mobile terminal according to the present disclosure can provide a UI for a simple and convenient voice input by a user's manipulation in the course of running an application.

To this end, assume that a mobile terminal of a watch type may include at least one of the components shown in FIGS. 1A to 1C. For instance, the mobile terminal of the watch type according to the present disclosure may be assumed as including the wireless communication unit 110, the microphone 122, the sensing unit 140, the display unit 151, the memory 160 and the controller 180 among the components shown in FIGS. 1A to 10.

The sensing unit 140 can detect a movement of the mobile terminal, a presence or non-presence of an object proximate to the mobile terminal, and the like. For instance, if a user holds a watch type mobile terminal worn on a user's wrist to a location close to a user's mouth, the sensing unit 140 can generate a sensing signal indicating that a movement of the mobile terminal has been detected and a sensing signal indicating that an object (e.g., a user's face, etc.) proximate to the mobile terminal has been detected. Based on the sensing signals generated by the sensing unit 140, the controller 180 can detect whether a gesture input is received.

The display unit 151 may include a touchscreen capable of receiving a touch input. Moreover, the mobile terminal according to the present disclosure can receive a user's touch input through a bezel region configured to enclose the display unit 151.

Figure 4:
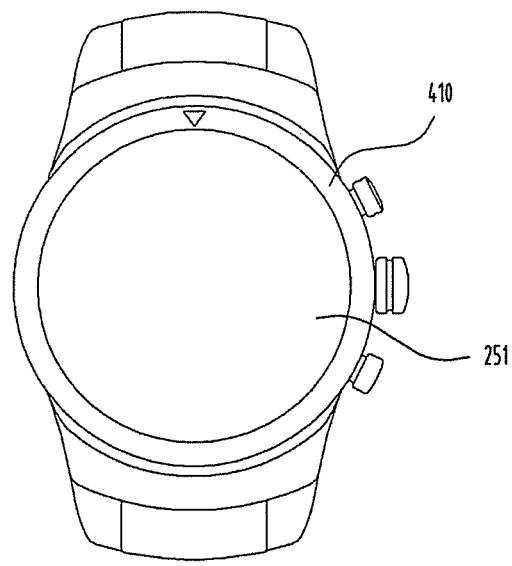
FIG. 4 is a diagram to describe a display unit and a bezel enclosing the display unit.

For instance, FIG. 4 is a diagram to describe the display unit 151 and the bezel enclosing the display unit 151.

Referring to FIG. 4, a bezel 410 configured to enclose a display unit 251 may be located around the display unit 251. In particular, the bezel 410 may form an exterior of a mobile terminal and may play a role in protecting the display unit 251 from external shock.

A touch sensor configured to receive a user's touch input may be buried in the bezel 410. Hence, the controller 180 may receive one touch input of touching the display unit 251 or another touch input of touching the bezel 410. The touch sensor buried in the bezel 410 may be configured in a manner of being extended from a touch sensor buried in the display unit 251.

Since each of the above-described bezel 410 and the above-described display unit 251 is able to receive a user's touch input, the bezel 410 and the display unit 251 may be named 'touch input unit' altogether. In particular, the touch input unit of the present disclosure may include at least one of the bezel capable of receiving a touch input and the display unit 151 capable of receiving a touch input.

For clarity of the following description, a user input of touching the display unit 151 and a user input of touching a bezel region shall be separately described. Yet, it is a matter of course that an operation, which will be performed in response to a user input of touching the display unit 151, can be performed in response to a user input of touching the bezel region. And, it is also a matter of course that an operation, which will be performed in response to a user input of touching the bezel region, can be performed in response to a user input of touching the display unit 151.

In particular, the user input of touching the bezel region may be substituted with the user input of touching the display unit 151. And, the user input of touching the display unit 151 may be substituted with the user input of touching the bezel region.

For another instance, the user input of touching the bezel region or the user input of touching the display unit 151 may be substituted with a manipulation of a button (e.g., a jog dial, a push type button, etc.) externally exposed on an outer surface of the mobile terminal.

Based on the above description, a mobile terminal according to the present disclosure is explained in detail with reference to the accompanying drawings as follows.

Figure 5:
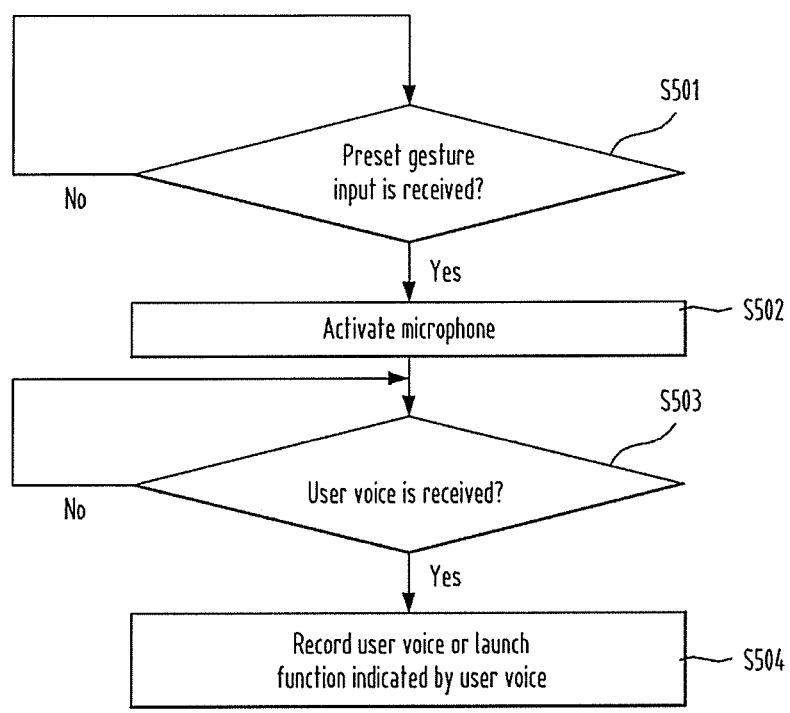
FIG. 5 is a flowchart for an operation of a mobile terminal according to the present disclosure.

FIG. 5 is a flowchart for an operation of a mobile terminal according to the present disclosure. For clarity of the following description, assume that the mobile terminal of the watch type is worn on a user's wrist.

Referring to FIG. 5, if a gesture input preset by a user is received [S501], the controller 180 activates the microphone 122 to enable a state of listening to a user's voice [S502]. If the microphone 122 is activated, the controller 180 can output a feedback indicating that a state capable of inputting a voice has been entered owing to the activation of the microphone 122. In this case, the feedback may have such a type as a display of an indicator (e.g., an image, an icon, a text, etc.), an output of sound, an output of vibration, or the like.

The preset gesture input for activating the microphone 122 may have one of various types. For instance, the preset gesture input for activating the microphone 122 may include a gesture of lifting the mobile terminal to the corner of the user's mouth.

Figure 6:
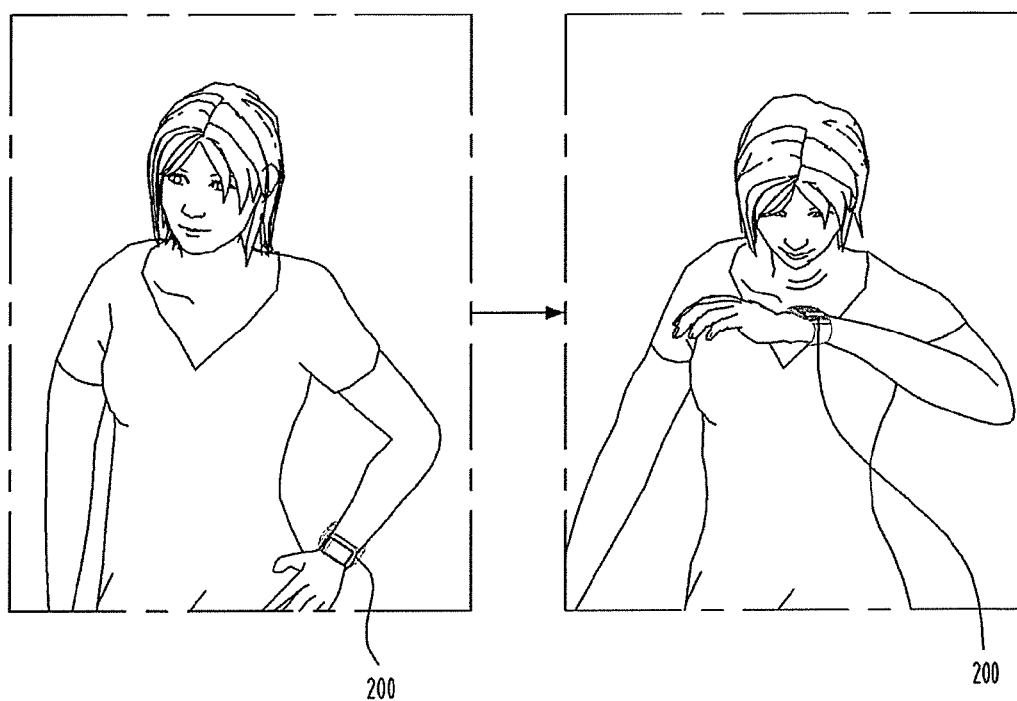
FIG. 6 is a diagram for one example of a preset gesture.

For instance, FIG. 6 is a diagram for one example of a preset gesture.

Referring to FIG. 6, if a user takes a gesture of lifting the mobile terminal to the corner of the user's mouth, the controller 180 can control the microphone 122 to be activated. In doing so, the controller 180 can determined whether a preset gesture is inputted or not based on at least one of a sensing signal generated from the sensing unit 140 to indicate that the mobile terminal has been lifted to a top from a bottom and a sensing signal generated from the sensing unit 140 to indicate that an object proximate to the mobile terminal has been detected.

In doing so, the controller 180 may be able to determine whether an object is proximate to the mobile terminal through a proximity sensor. And, the controller 180 may be able to determine whether an object is proximate to the mobile terminal based on a distance from a nearby object through a distance measurement sensor (e.g., a distance measurement through light emittance and reception of laser or infrared ray). For instance, if the proximity sensor generates a sensing signal of sensing a proximate object, the controller 180 can determine that there is an object proximate to the mobile terminal. For another instance, if a distance from a prescribed object measured through the distance measurement sensor lies within a prescribed distance, the controller 180 may determine that there is an object proximate to the mobile terminal.

For another instance, based on a sensing signal generated from the sensing unit 140 to indicate that the mobile terminal has been lifted to a top from a bottom and an information indicating whether a user's mouth or eye is detected from an image captured by a camera, the controller 180 may determine whether a preset gesture is inputted. For instance, if a sensing signal indicating that the mobile terminal has been moved from a bottom to a top is generated, the controller 180 activates a camera and is then able to photograph a surrounding environment through the activated camera. When an image inputted through the camera is analyzed, if a user's mouth is detected or a user's eye is not detected (i.e., as the mobile terminal approaches the corner of the user's mouth sufficiently, if the user's eye cannot be photographed through the camera), the controller 180 can determine that a preset gesture has been inputted.

While the microphone 122 is activated, if a user's voice is inputted [S503], the controller 180 may create a voice file of recording the user's voice or may perform a function indicated by the user's voice [S504].

In doing so, if another preset gesture input (e.g., an input of a gesture of lowering the mobile terminal), a preset touch input (e.g., a touch input of touching an indicator) or the like is received, the controller 180 may perform the function indicated by the user's voice.

Figure 7:
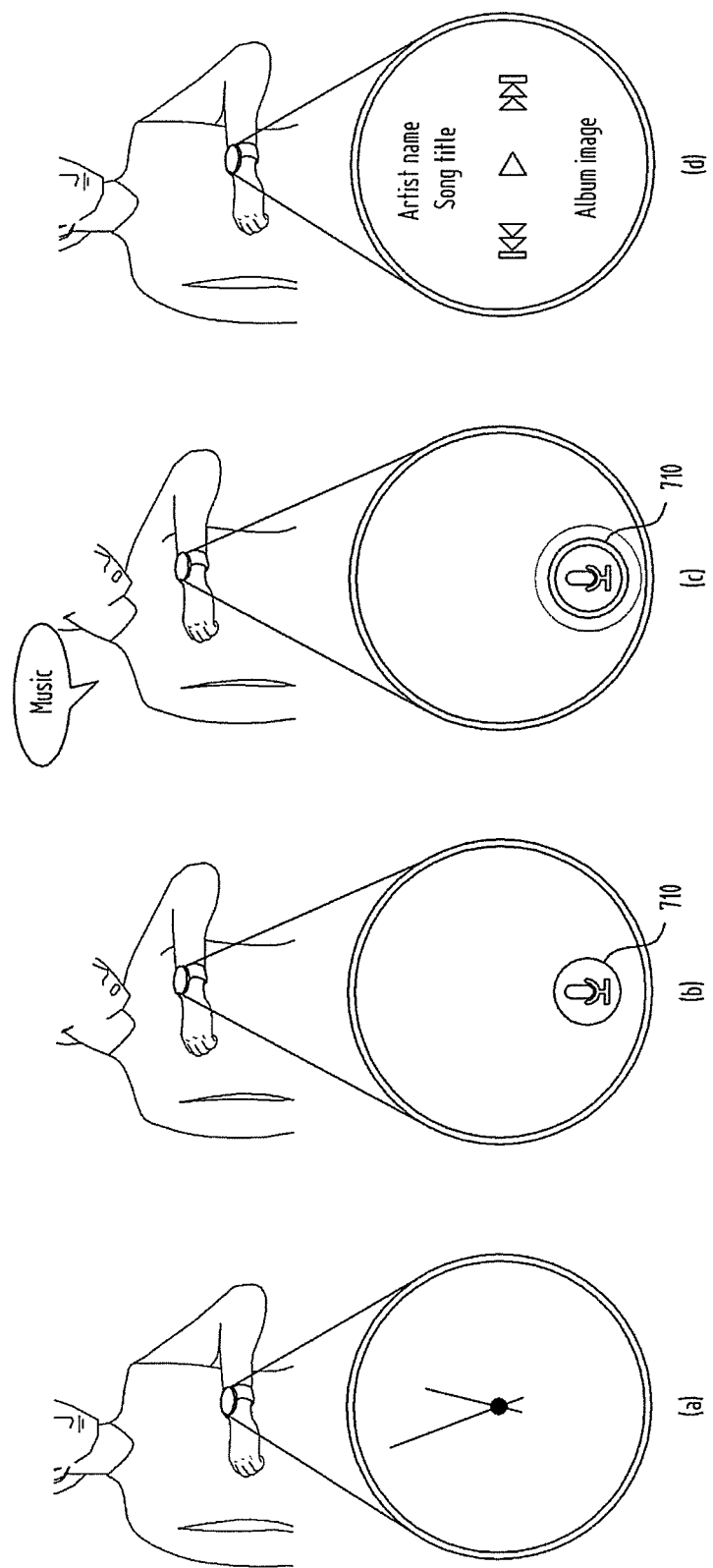
FIG. 7 is a diagram for one example of activating a microphone and then launching a function indicated by a user's voice.

For instance, FIG. 7 is a diagram for one example of activating the microphone 122 and then launching a function indicated by a user's voice.

Referring to FIG. 7 (*a*) and FIG. 7 (*b*), if a gesture input of lifting the mobile terminal spaced apart from the corner of user's mouth to the corner of the user's mouth is received, the controller 180 can activate the microphone 122. Once the microphone 122 is activated, referring to FIG. 7 (*b*), the controller 180 can control an indicator 710 (e.g., an icon, a text. Etc.), which indicates that the microphone 122 is activated, to be outputted.

If a user's voice is inputted through the microphone 122, the controller 180 can control an information, which indicates that the user's voice is being inputted through the microphone 122, to be outputted. According to the example shown in FIG. 7 (*c*), as a user's voice is inputted, a size of the indicator 710 is changed.

Besides, after a user's voice has been received, if a prescribed gesture is received, the controller 180 may cancel the inputted user's voice. In doing so, the controller 180 can control a state (e.g., the state shown in FIG. 7 (*b*)), in which an input of a voice can be received from the user again, to be entered. The gesture for cancelling the voice input may include one of various types such as a gesture of shaking the mobile terminal a prescribed number of times, a gesture of rotating a wrist having the mobile terminal worn thereon, a gesture of lowering the mobile terminal and then lifting the mobile terminal, and the like.

After the user's voice has been inputted, if a gesture input of lowering the mobile terminal (e.g., a gesture input of spacing the mobile terminal apart from the corner of the user's mouth) is received [FIG. 7 (*d*)], the controller 180 can launch a function indicated by the user's voice.

For instance, if an application name is contained in the user's voice, a corresponding application may be launched. If a prescribed person's information (e.g., a phone number, a name of a person registered at a phonebook, etc.) is contained in the user's voice, the controller may output the prescribed person's information (e.g., a contact information of a person registered at a phonebook) or a message composition screen for sending a message (e.g., a text message, an instant message, an email, etc.) to the prescribed person or may make a phone call to the prescribed person. If a time or date is contained in the user's voice, the controller 180 may display a schedule at a time indicated by the voice or on a date indicated by the voice or may control a screen, which is provided to register a new alarm or schedule at the time or date indicated by the voice, to be outputted.

According to the example shown in FIG. 7 (c) and FIG. 7 (d), a music application indicated by the user' voice is launched or run.

For another instance, the controller 180 may run a function intended by a user through a natural language processing. For example, although an input of a voice (e.g., 'Check tomorrow's appointment') failing to contain a word indicating a specific application is received from a user, it is able to confirm whether the user has an appointment in a manner of selecting an application (e.g., a schedule application) appropriate for checking an appointment and then running the selected application.

In one case that the user lifts the mobile terminal to the corner of user's mouth while touching the display unit 151 or the bezel and a case that the user inputs a voice while touching the display unit 151 or the bezel after lifting the mobile terminal to the corner of the user's mouth, the controller 180 can control at least one of a content currently outputted through the display unit 151, a content currently played by the mobile terminal, a capture image of capturing an outputted screen of the display unit 151, and a data indicated by a touch input to be forwarded to a target indicated by a voice command.

Figure 8:
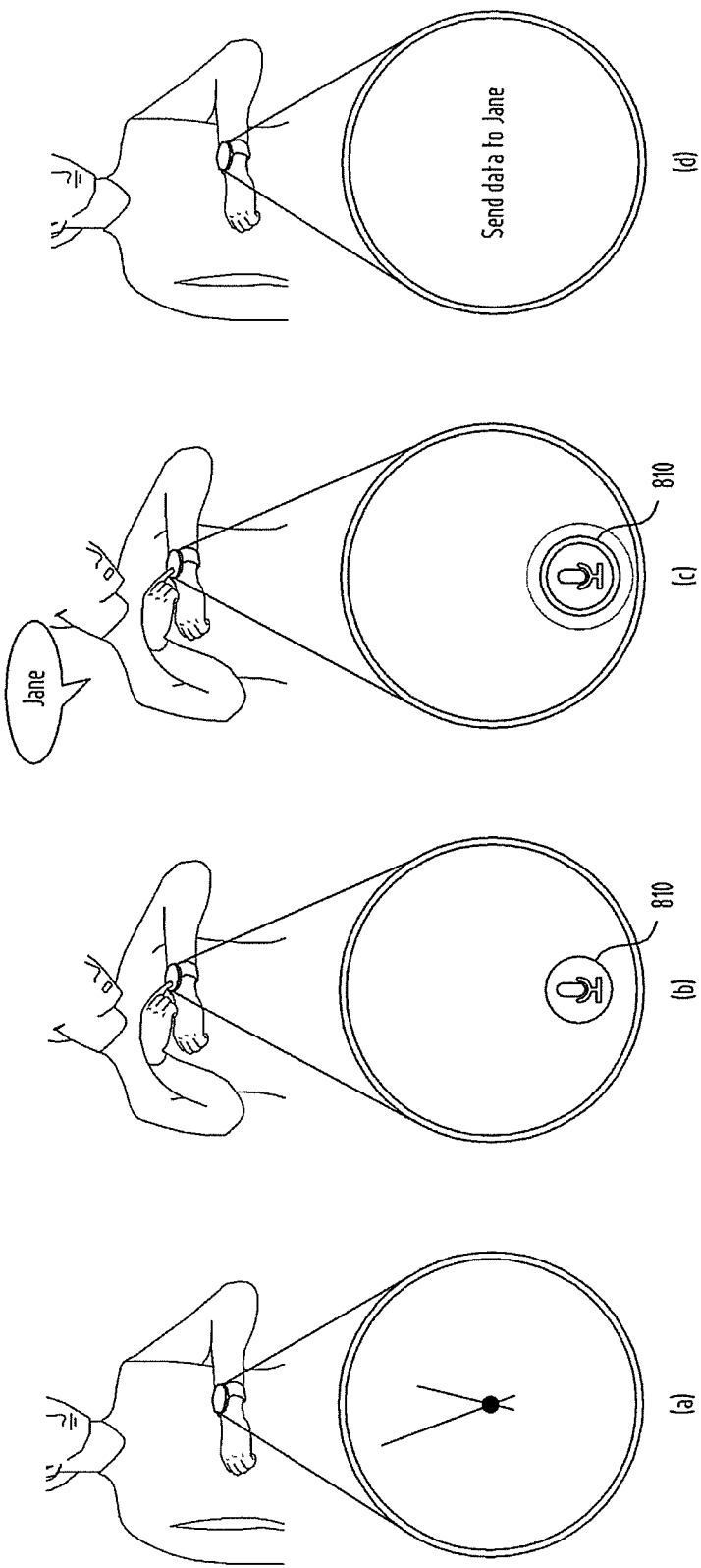
FIG. 8 is a diagram for one example of activating a microphone and then sending a content to a target indicated by a user's voice.

For instance, FIG. 8 is a diagram for one example of activating the microphone 122 and then sending a content to a target indicated by a user's voice.

Referring to FIG. 8 (a) and FIG. 8 (b), if a gesture input of lifting the mobile terminal spaced apart from the corner of user's mouth to the corner of the user's mouth is received, the controller 180 can activate the microphone 122.

After the user has inputted a voice while touching the touchscreen [FIG. 8 (b), FIG. 8 (c)], if the user takes a gesture of lowering the mobile terminal (i.e., a gesture input of spacing the mobile terminal apart from the corner of the user's mouth) [FIG. 8 (d)], the controller 180 can send a content currently outputted through the display unit 151, a content currently played by the mobile terminal, a capture image of capturing an outputted screen of the display unit 151, or a data corresponding to a touch location to a target indicated by a user voice. According to the example shown in FIG. 8 (c) and FIG. 8 (d), data is sent to Jane corresponding to a person indicated by the user voice.

On the other hand, after a user voice has been received, if a prescribed gesture is received, the controller 180 may cancel an inputted user voice. In this case, the controller 180 can control a state (e.g., a state shown in FIG. 8 (b)), in which a voice can be inputted from the user, to be entered again. In this case, the gesture for cancelling the voice input can include one of various types such as a gesture of shaking the mobile terminal a prescribed number of times, a gesture of rotating a wrist having the mobile terminal worn thereon, a gesture of lowering the mobile terminal and then lifting the mobile terminal, and the like.

In one of a case that the user lifts the mobile terminal to the corner of user's mouth while touching the display unit 151 or the bezel and a case that the user inputs a voice while touching the display unit 151 or the bezel after lifting the mobile terminal to the corner of the user's mouth, the controller 180 can create a recording file of recording a user's voice.

Figure 9:
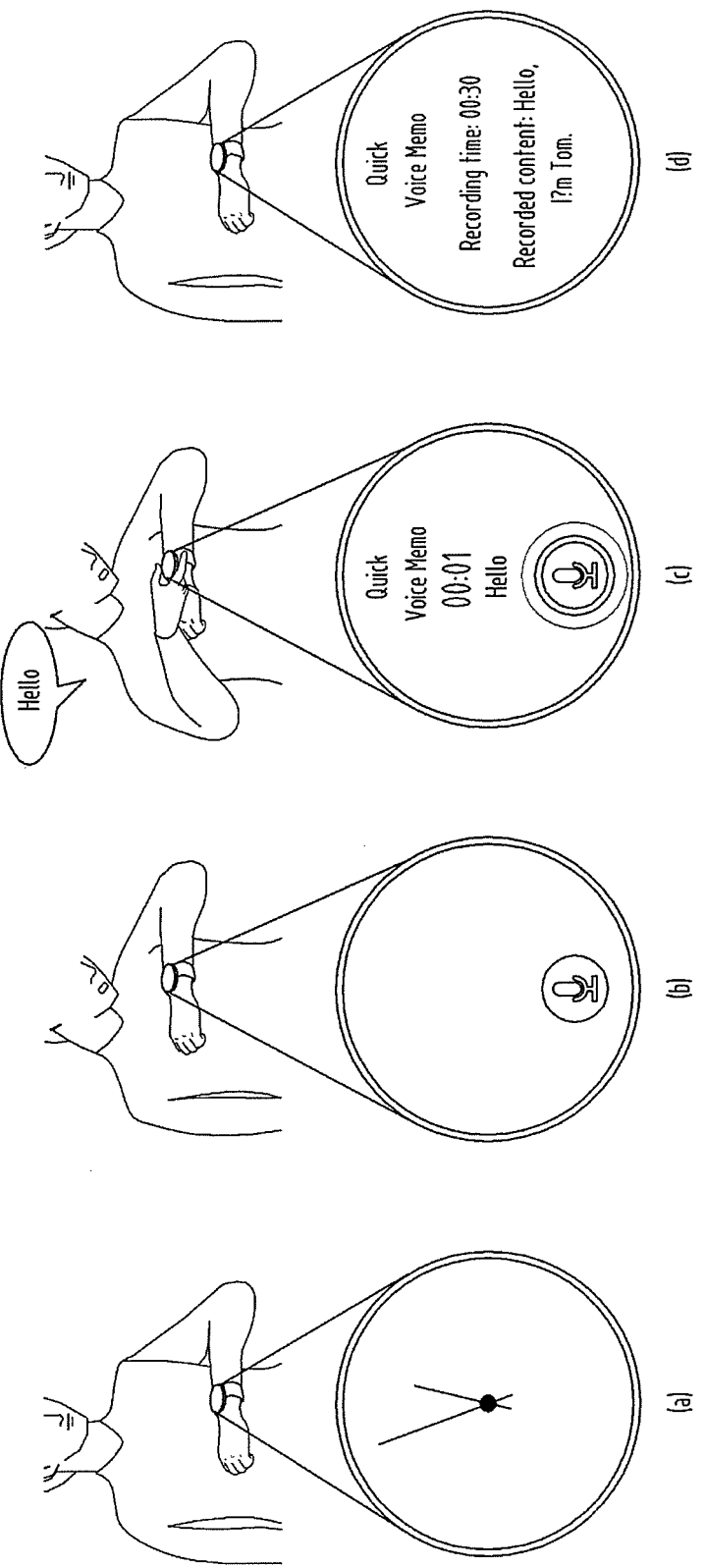
FIG. 9 is a diagram for one example of activating a microphone and then creating a recording file of recording a user's voice.

For instance, FIG. 9 is a diagram for one example of activating the microphone 122 and then creating a recording file of recording a user's voice.

Referring to FIG. 9 (a) and FIG. 9 (b), if a gesture input of lifting the mobile terminal spaced apart from the corner of user's mouth to the corner of the user's mouth is received, the controller 180 can activate the microphone 122. If the user touches the bezel [FIG. 9 (b), FIG. 9 (c)], the controller 180 can start the recording of sound inputted through the microphone 122.

In doing so, through the display unit 151, as shown in FIG. 9 (c), a recording information (e.g., a recording time, a text converting from a voice inputted through the microphone 122 by STT (speech to text), etc.) indicating that the recording is in progress can be outputted. According to the example shown in FIG. 9 (c), a recording time '00:01' and a text 'Hello' converting from a user voice by STT are outputted.

Thereafter, if a gesture input of lowering the mobile terminal (i.e., a gesture input of detaching the mobile terminal from the corner of user's mouth) is received [FIG. 9 (d)], the controller 180 ends the recording and is able to control the microphone 122 to be deactivated. If the recording is ended, the controller 180 may output a text converting the recorded voice by STT. According to the example shown in FIG. 9 (d), a text 'Hello, I'm Tom' converting from the recorded voice is outputted.

Although FIG. 9 shows one example that the user's voice recording is started only if the user touches the bezel with two pointers, a user's touch input for starting a voice recording is non-limited by the example shown in the drawing. For example, the controller 180 may control a voice recording to be started by one of a touch input with a single pointer, a drag input with a pointer and the like.

According to the example shown in FIG. 8 or FIG. 9, while the display unit 151 is touched, if a preset gesture input is applied, data is sent to a target indicated by a voice. While the bezel is touched, if a preset gesture input is applied, a recording file of recording a user's voice is created. On the contrary, in response to a preset gesture input applied during a touch to the bezel, data may be sent to a target indicated by a user voice. In response to a preset gesture input during a touch to the display unit 151, a voice recording may be started.

In the following description, the present disclosure is further described in detail with reference to various use cases applicable to the present disclosure.

Figure 10:
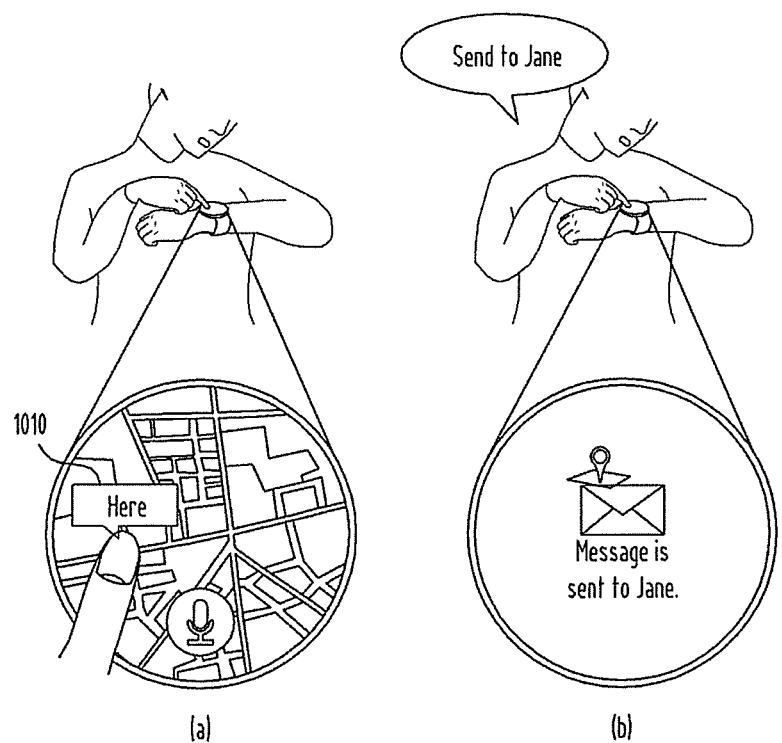
FIG. 10 is a diagram for one example of sending a data indicated by a pointer to a target indicated by a user voice in response to a preset gesture input.

FIG. 10 is a diagram for one example of sending a data indicated by a pointer to a target indicated by a user voice in response to a preset gesture input. For clarity of the following description, assume that a map application is currently running through the mobile terminal.

Referring to FIG. 10 (a), after a user has taken a gesture of lifting the mobile terminal to the corner of user's mouth, if the user touches a random point on the display unit 151 (or the user touches a random point on the display unit 151 over a prescribed time), the controller 180 activates the microphone 122 and is able to control a marker 1010, which indicates a location touched with a pointer, to be displayed.

While the display unit 151 is touched with the pointer, if a user's voice input is received, the controller 180 can send a location information indicated by the marker 1010 to a target indicated by the user's voice input.

For example, referring to FIG. 10 (*b*), if a target 'Jane' is contained in the user's voice input, the controller 180 can control the location information indicated by the marker 1010 to be set to a terminal of 'Jane'. In particular, the controller 180 extracts a contact information of 'Jane', who is a person indicated by a user voice, from a phonebook saved in the memory 170 or an external server and is then able to send the location information to the terminal of 'Jane' using the extracted contact information.

In this case, the location information may include at least one of coordinates information (e.g., latitude and longitude) of a location indicated by the marker 1010, an address information (e.g., administrative district address), a URL address for accessing the location indicated by the marker 1010 on web, and the like.

Unlike the example shown in FIG. 10, the controller 180 may send a capture image of capturing a map currently outputted through the mobile terminal to a target terminal. In particular, if a user's voice input indicates a target 'Jane', the controller 180 may send a capture image of capturing a map currently outputted through the display unit 151 to the terminal of 'Jane'.

Although FIG. 10 shows one example that a location information of a location indicated by a pointer is sent to a target terminal, such a content indicated by the pointer as a photo, a video, a document, a contact information, a schedule information, an alarm information or the like may be sent to the target terminal. For example, while a prescribed item on a content list is selected with a pointer, if a user voice is inputted, the controller 180 can send a content corresponding to the selected item to a target indicated by the pointer. In this case, the content may mean various data that can be handled by the mobile terminal. In particular, the content may include one of a photo, a video, a document, a contact information, a schedule information, an alarm information and the like.

Figure 11:
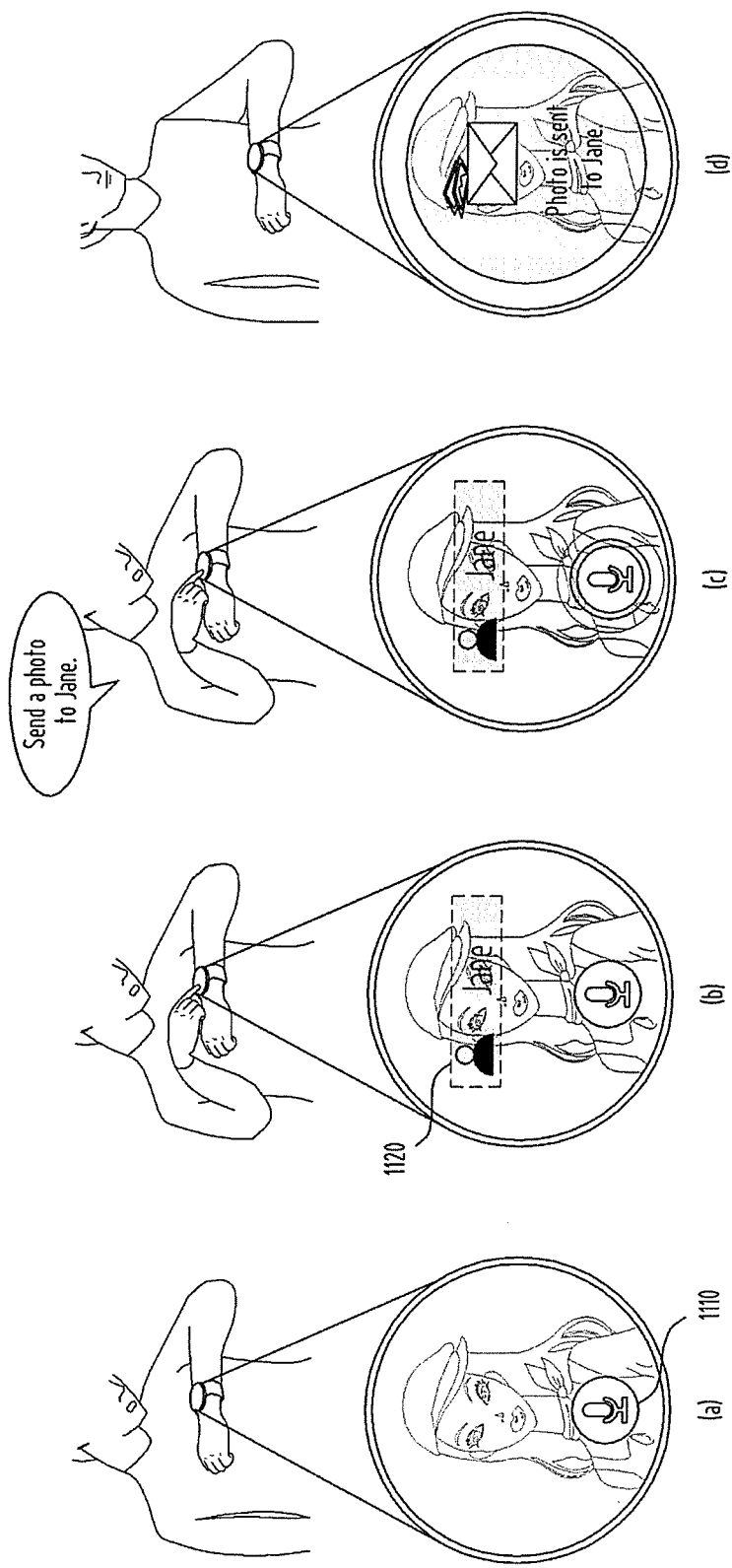
FIG. 11 is a diagram for one example of sending a content currently outputted through a display unit to a target indicated by a user voice.

FIG. 11 is a diagram for one example of sending a content currently outputted through the display unit 151 to a target indicated by a user voice. For clarity of the following description, assume that a photo is currently outputted through the display unit 151.

Referring to FIG. 11, if a user takes a gesture of lifting the mobile terminal to the corner of user's mouth, the controller 180 activates the microphone 122 and is then able to control an indicator 1110, which indicates that the microphone 122 is activated, to be outputted [FIG. 11 (*a*)]. If the user touches the display unit 151 through which the photo is currently outputted, as shown in FIG. 11 (*b*), the controller 180 can control an information 1120 on a subject in the photo to be outputted in response to the user's touch input. In particular, the controller 180 may extract an information on the subject in the photo from a phonebook (or an external server) through a face matching between a face in the photo and a photo (e.g., a profile photo) registered at the phonebook (or the external server) and may output an information on the subject in the photo using metadata of the photo. According to the example shown in FIG. 11 (*b*), a name of the subject in the photo is 'Jane'.

If it is unable to obtain the information on the subject in the photo (e.g., if the profile photo matching the face of the subject in the photo fails to be registered at the phonebook), the controller 180 may display an indicator indicating that the information of the corresponding subject cannot be outputted or may control any information not to be outputted in response to the user's touch input.

While the display unit 151 is touched with a pointer, if a user's voice input is received, the controller 180 can send a photo to a target indicated by the user's voice input.

For instance, if a target 'Jane' is contained in the user's voice [FIG. 11 (*c*)], the controller 180 can control the photo currently outputted through the display unit 151 to be sent to a terminal of 'Jane' [FIG. 11 (*d*)]. In particular, the controller 180 extracts a contact information of 'Jane', who is a person indicated by the user voice, from a phonebook saved in the memory 170 or an external server and is then able to send the photo to the terminal of 'Jane' using the extracted contact information.

According to the example shown in FIG. 10 or FIG. 11, a user's voice indicates a name of a specific person. Here, the user may designate one or more recipients, either displayed in the photo or not, to send the photo. Alternatively, the recipient may be automatically determined based on facial recognition of persons in the photo. Also, it may be unnecessary for a user's voice to indicate a name of a target to which data will be sent. Unlike the examples shown in the drawings, a user's voice may indicate a phone number or ID of a target to which data will be sent or a person currently outputted through the display unit 151.

Figure 12:
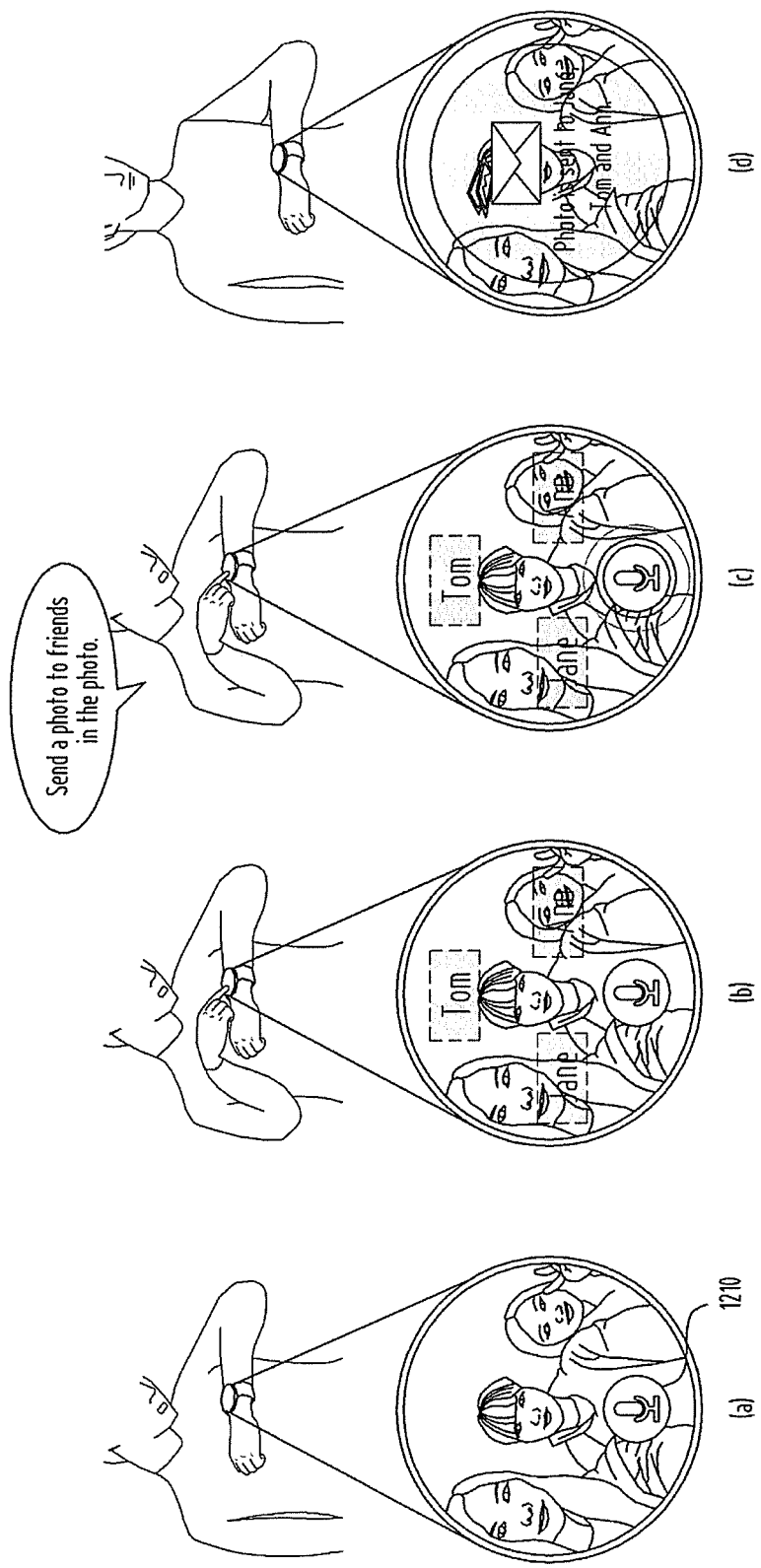
FIG. 12 is a diagram for another example of sending a content currently outputted through a display unit to a target indicated by a user voice.

For instance, FIG. 12 is a diagram for another example of sending a content currently outputted through the display unit 151 to a target indicated by a user voice. For clarity of the following description, assume that a photo in which a plurality of persons are contained is currently outputted through the display unit 151.

Referring to FIG. 12, if a user takes a gesture of lifting the mobile terminal to the corner of user's mouth, the controller 180 activates the microphone 122 and is then able to control an indicator 1210, which indicates that the microphone 122 is activated, to be outputted [FIG. 12 (*a*)]. If random location on the display unit 151 through which a photo is currently outputted is touched with a pointer, referring to FIG. 12 (*b*), the controller 180 can control information on each of a plurality of subjects contained in the photo to be outputted in response to the user's touch input. According to the example shown in FIG. 12 (*b*), the subjects in the photo include Jane, Tom and Ann, respectively.

Thereafter, if a voice is received from the user and the received voice indicates a specific subject in the photo, the controller 180 can send the photo to a person indicated by the user's voice. For instance, if the user's voice (e.g., 'Friends in the photo') indicates all the subjects in the photo [FIG. 12 (*c*)], the controller 180 can control the photo currently outputted through the display unit 151 to be sent to terminals of the persons (i.e., Jane, Tom and Ann) in the photo [FIG. 12 (*d*)].

If it is unable to obtain a contact information on at least one of a plurality of the persons in the photo, the controller 180 sends the photo to the terminals of the persons of which contact information are obtainable and may control a message, which indicates that the photo cannot be sent to the rest of the persons, to be outputted. For instance, if it is unable to obtain a contact information of Ann despite that contacts of Jane and Tom among Jane, Tom and Ann are obtainable, the controller 180 can control the photo to be sent to the terminals of Jane and Tom only except Ann.

If a user's voice (e.g., 'Left person', 'Right person', etc.) indicates a person located at a specific location, the controller 180 may send the photo to the terminal of the person located at the location indicated by the user's voice. For instance, if the user's voice indicates 'Left person', like the example shown in FIG. 12 (c), the controller 180 may send the photo to the terminal of Jane who is located on the far left side in the photo.

Figure 13:
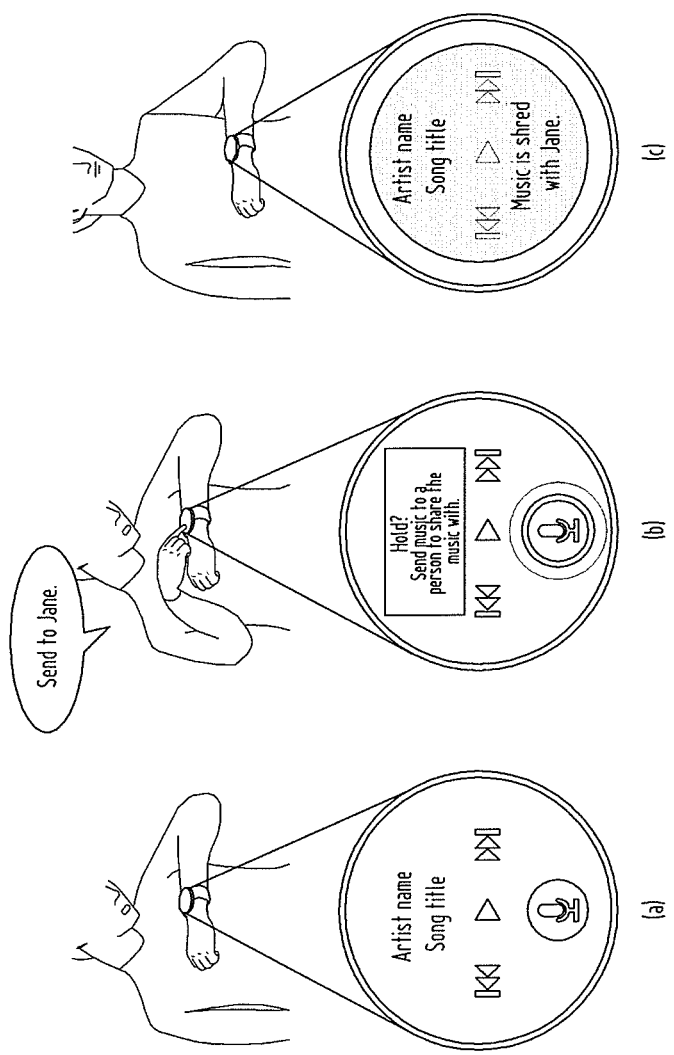
FIG. 13 is a diagram for one example of sending a content currently played in a mobile terminal to a target indicated by a user voice.

FIG. 13 is a diagram for one example of sending a content currently played in a mobile terminal to a target indicated by a user voice. For clarity of the following description, assume that the mobile terminal is playing a music file.

Referring to FIG. 13, if a user takes a gesture of lifting the mobile terminal to the corner of user's mouth, the controller 180 activates the microphone 122 and is then able to control an indicator, which indicates that the microphone 122 is activated, to be outputted [FIG. 13 (a)]. Thereafter, while the user is touching the touchscreen, if the user inputs a voice, the controller 180 can control a currently played music file to the sent to a target indicated by the voice.

For instance, if the user's voice contains a target 'Jane' [FIG. 13 (b)], the controller 180 can control the music file currently played by the mobile terminal to be sent to the terminal of Jane [FIG. 13 (c)]. In particular, the controller 180 extracts a contact information of Jane who is the person indicated by the user's voice from a phonebook saved in the memory 170 or an external sever and is then able to send the music file to the terminal of Jane using the extracted contact information.

According to the example shown in FIG. 13, a multimedia file (e.g., a music file, a video file, etc.) currently played in the mobile terminal is sent to a target terminal indicated by a user voice. Unlike the example shown in the drawing, the controller 180 may send a streaming data, which is provided to enable the multimedia file currently played in the mobile terminal to be played in the target terminal by streaming, to the target terminal. Having received the streaming data, the target terminal may be able to play a content currently played in the mobile terminal by streaming.

According to the examples shown in FIGS. 10 to 13, if a user's voice is inputted, the controller 180 can send data (e.g., a location information, a capture image, a photo file, a music file, etc.) to a target indicated by the user's voice. After a user's voice has been inputted, if a preset different gesture (e.g., a gesture input of detaching the mobile terminal from the corner of user's mouth) is received, the controller 180 may control data to be sent to a target indicated by the user's voice only.

Until a preset different gesture is received, if a user indicates a plurality of targets through voice, the controller 180 may send data to a plurality of the targets all indicated by the user voice. For instance, if the user voice indicates Jane and Tom, the controller 180 may be able to send data to both of the terminal of Jane and the terminal of Tom.

Unlike the examples shown in FIGS. 10 to 13, if a user's voice is inputted (or, if a preset different gesture is received after inputting a user voice), the controller 180 can designate a target indicated by the user voice as a recipient and is also able to control a message composing screen, to which data (e.g., a location information, a capture image, a photo file, a music file, etc.) is attached, to be outputted.

Figure 14:
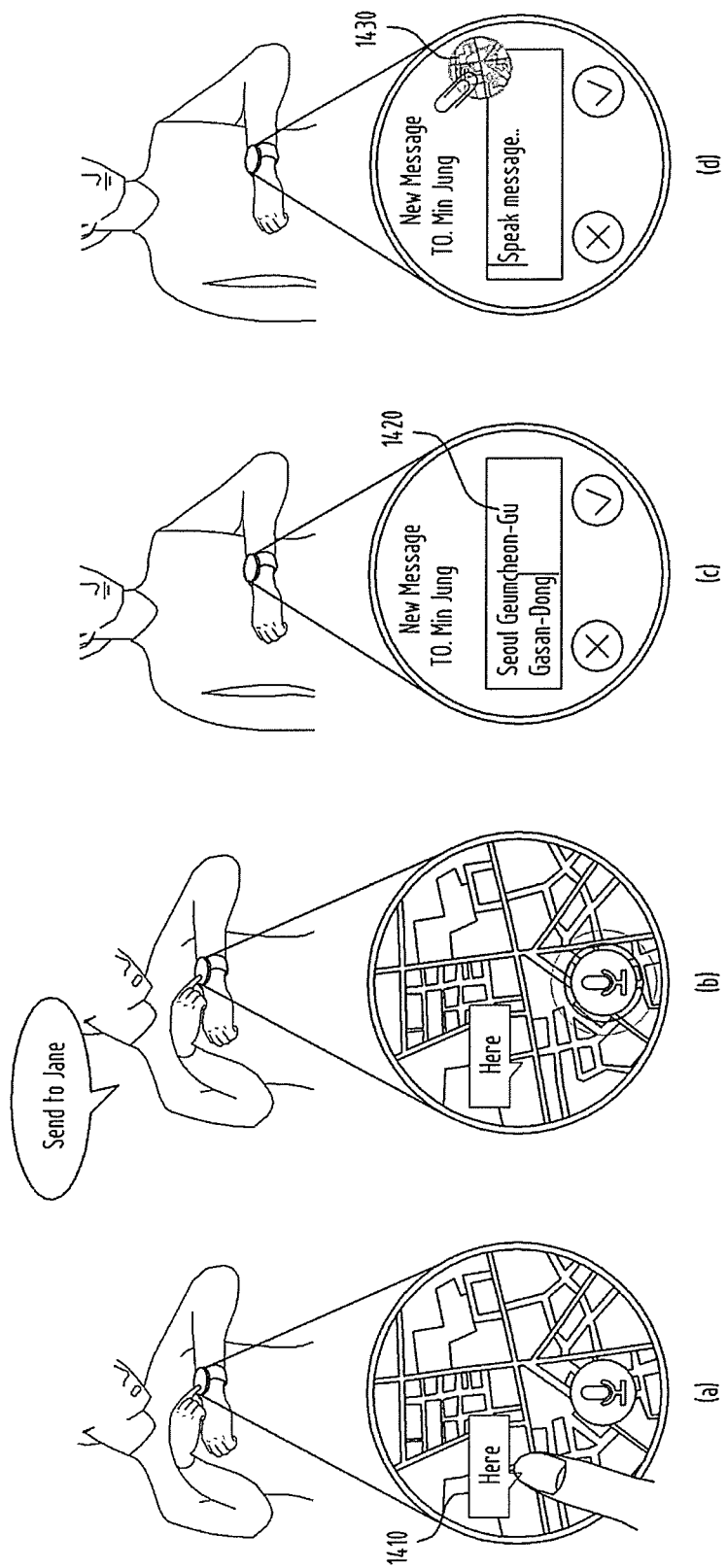
FIG. 14 is a diagram for one example of outputting a screen for composing a data attached message.

For instance, FIG. 14 is a diagram for one example of outputting a screen for composing a data attached message. For clarity of the following description, assume that a map application is currently run through the mobile terminal.

Referring to FIG. 14, if a user takes a gesture of lifting the mobile terminal to the corner of user's mouth and touches a random point on the display unit 151, the controller 180 activates the microphone 122 and is then able to control an indicator 1410 to be displayed at the location touched with a pointer [FIG. 14 (a)].

While the display unit 151 is touched with the pointer, if a user's voice input is received, the controller 180 can control a message composing screen, which is provided to compose a message to be sent to a target indicated by the user's voice input, to be outputted. In doing so, a location information (e.g., an administrative area address, a URL address for accessing a location indicated by the marker 1410 on web, etc.) corresponding to the displayed location of the marker 1410 may be inserted in a body of the message or a capture image of capturing a map may be set as an attachment file of the message.

For instance, referring to FIG. 14 (b), if a user's voice input indicates a target 'Jane', the controller 180 can control a message composing screen, which is provided to compose a message to be sent to a terminal of Jane, to be displayed. In doing so, the controller 180 may control a location information 1420 to be inserted in a body of the message [FIG. 14 (c)] or may control a capture image of capturing an output screen of the display unit 151 to be set as an attachment file 1430 of the message [FIG. 14 (d)].

According to the example shown in FIG. 14, while a map application is running, an operation of the mobile terminal is illustrated. Yet, as mentioned in the foregoing descriptions with reference to FIGS. 11 to 13, while such a content as a photo file, a music file or the like is outputted, a message compositing screen for composing a message, to which the content such as the photo file, the music file or the like is attached, may be outputted in response to a user voice.

While the message composing screen is outputted, if a user voice is inputted, the controller 180 can control a text, which converts from the user voice by STT, to be inserted in a message body.

Figure 15:
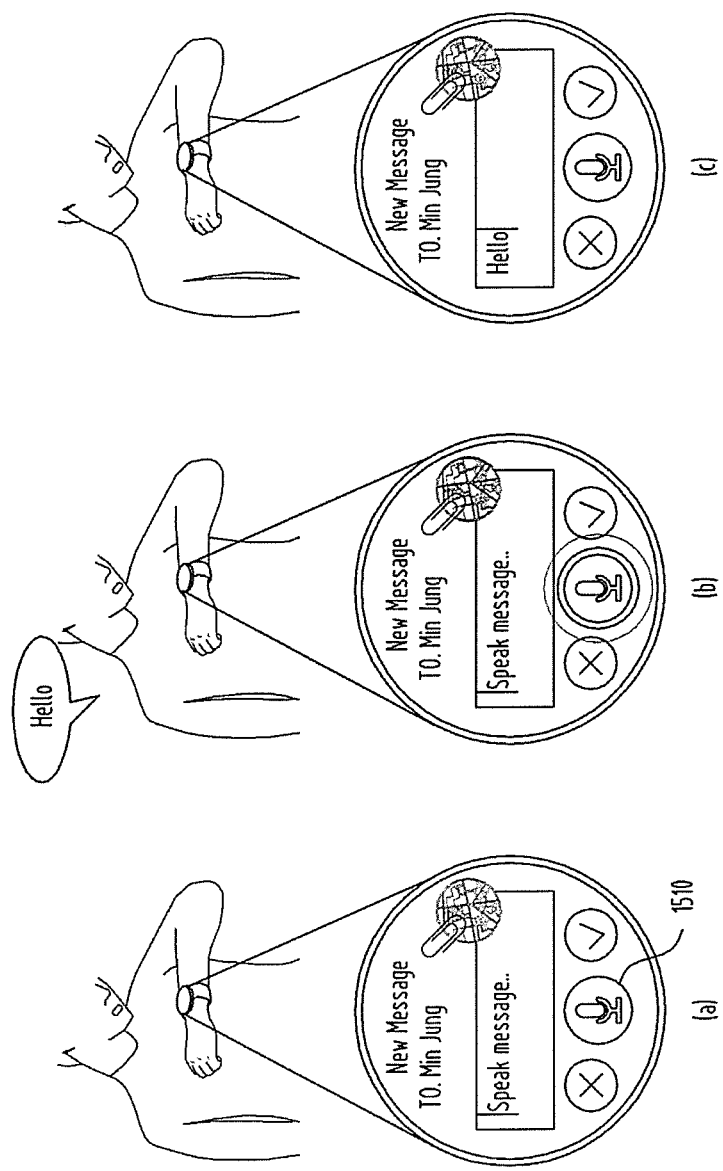
FIG. 15 is a diagram for one example of inserting a text converting from a user voice by STT into a body of a message.

For instance, FIG. 15 is a diagram for one example of inserting a text converting from a user voice by STT into a body of a message.

Referring to FIG. 15, if a user takes a gesture of bringing the mobile terminal to the corner of user's mouth, the controller 180 activates the microphone 122 and is then able to control an indicator 1510, which indicates that the microphone 122 is activated, to be outputted [FIG. 15 (a)]. On the contrary, if a user takes a gesture of detaching the mobile terminal from the corner of the user's mouth, the controller 180 deactivates the microphone 122 and is able to end the output of the indicator. In particular, the user can simply activate/deactivate the microphone 122 by taking a gesture of lifting/lowering the mobile terminal to/from the corner of the user's mouth.

While the microphone 122 is activated, if a user's voice is received, the controller 180 can control a text, which converts from the voice inputted by the user by STT, to be inserted in a body of a message. For instance, if the user's voice is 'Hello' [FIG. 15 (b)], the controller 180 can control a text 'Hello' to be inserted in the body of the message [FIG. 15 (c)].

In doing so, in order to solve a problem that the user's voice is incorrectly converted, if a preset gesture (e.g., a gesture of shaking the mobile terminal a prescribed number of times, a gesture of rotating a wrist having the mobile terminal worn thereon, a gesture of lowering the mobile terminal and then lifting the mobile terminal, etc.) is received within a prescribed time after outputting the text converting from the user's voice by STT, the controller 180 can control the converting text to be deleted.

For instance, if a gesture of lowering the mobile terminal and then lifting the mobile terminal (i.e., a gesture of detaching the mobile terminal from the corner of user's mouth and then holding it back to the corner of the user's mouth) is received within a prescribed time after outputting the text converting from the user's voice by STT, as shown in FIG. 15 (*d*), the controller 180 can delete the text converting from the user voice by STT.

If the user's message composition is complete, the controller 180 can send the composed message to a target. For instance, the controller 180 can initiate the message sending in response to an input of a touch to a button for triggering the message sending or a user's voice command for triggering the message sending.

According to the examples shown in FIGS. 10 to 13, to a target indicated by a user voice, data (e.g., a location information, a capture image, a photo file, a music file, etc.) is sent. Unlike the examples shown in the drawings, if a target to which data will be sent is determined in advance, the controller 180 may control a recording file of recording a user voice or a text converting from a user voice by STT to be sent to the target.

Figure 16:
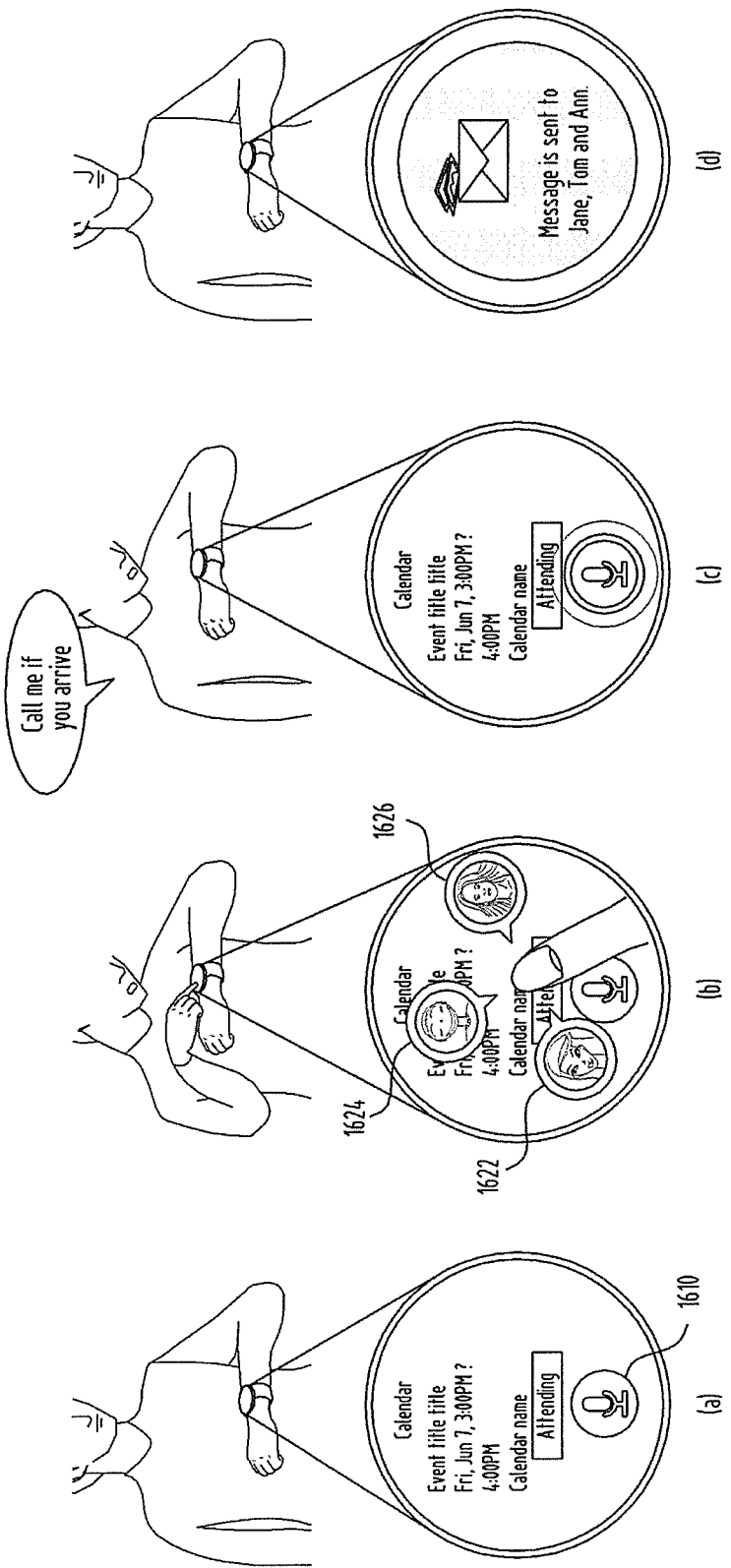
FIG. 16 is a diagram for one example of sending a message created on the basis of a user voice to a target.

For instance, FIG. 16 is a diagram for one example of sending a message created on the basis of a user voice to a target. For clarity of the following description, assume that a schedule information for scheduling a plurality of persons to attend is outputted through the display unit 151.

Referring to FIG. 16, if a user takes a gesture of lifting the mobile terminal to the corner of user's mouth, the controller 180 activates the microphone 122 and is then able to control an indicator 1610, which indicates that the microphone 122 is activated, to be outputted [FIG. 16 (*a*)]. If a user touches the display unit 151, referring to FIG. 16 (*b*), the controller 180 can control information on persons, who are scheduled to attend at the schedule, to be outputted in response to the user's touch input. In particular, the controller 180 extracts contact information, which matches a name of the person scheduled to attend at the schedule, from a phonebook or an image matching the name of the person scheduled to attend at the schedule and is then able to display the extracted information or image on the display unit 151. According to the example shown in FIG. 16 (*b*), photos 1622, 1624 and 1626 of the persons scheduled to attend at the schedule are outputted.

Thereafter, if the user inputs a voice, the controller 180 can send a recording file of recording the voice inputted by the user or a text converting from the user inputted voice by STT to the persons scheduled to attend at the schedule.

For example, if the user inputs a voice 'Call me when you arrive' [FIG. 16 (*c*)], the controller 180 can control a voice recording file of recording the user's voice or a text 'Call me when you arrive' to be sent to the persons scheduled to attend at the schedule [FIG. 16 (*d*)].

For another example, as mentioned in the foregoing description with reference to FIG. 15, the controller 180 outputs a message composing screen for composing a message to be sent to targets and is then able to control a text, which converts from a user voice by STT, to be inserted in a body of the message.

If a user takes a gesture of bringing the mobile terminal to the corner of user's mouth, a sight of the display unit 151 may or may not be secured depending on a distance from the mobile terminal to the user's mouth. Hence, depending on whether the user secures the sight of the display unit 151, the controller 180 may output a text converting from a user voice or skip the text output.

For instance, FIG. 17 is a diagram for one example of determining whether to output a text converting from a user voice by STT depending on a distance between a user and a mobile terminal.

Referring to FIG. 17 (*a*), after a user has lifted the mobile terminal, as a distance between the user and the mobile terminal is sufficiently long, if the user can watch the display unit 151 of the mobile terminal, the controller 180 can control a text converting from a user voice by STT to be outputted through the display unit 151.

On the other hand, referring to FIG. 17 (*b*), after a user has lifted the mobile terminal, as a distance between the user and the mobile terminal is short, if the user is unable to watch the display unit 151 of the mobile terminal, the controller 180 can skip the output of the text converting from the user voice by STT.

According to the examples shown in FIG. 17 (*a*) and FIG. 17 (*b*), the controller 180 may determine whether the distance between the user and the mobile terminal becomes equal to or greater than a preset distance through a proximity sensor, a distance measurement sensor and/or the like. And, the controller 180 may determine whether the user secures the sight of the display unit 151 by analyzing an image inputted through the camera. For instance, if user's eyes are captured in the image inputted through the camera, the controller 180 may output the text converting from the user voice by STT through the display unit 151. If the user's eyes are not captured in the image inputted through the camera, the controller 180 may skip the output of the text converting from the user voice by STT.

For another instance, depending on whether user's eyes face the mobile terminal or not, the controller 180 may determine whether to output a text converting from a user voice by STT.

The mobile terminal according to the present disclosure may activate or deactivate the microphone 122 in response to a user's gesture input in the course of talking on the mobile terminal.

Figure 18:
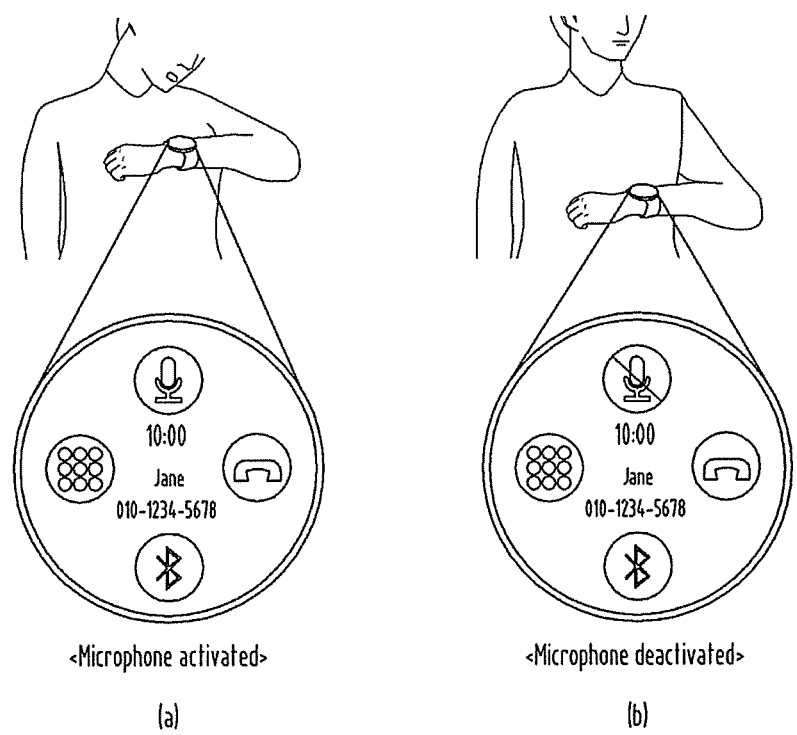
FIG. 18 is a diagram for one example of activating or deactivating a microphone in the course of talking on a mobile terminal.

FIG. 18 is a diagram for one example of activating or deactivating a microphone in the course of talking on a mobile terminal.

Referring to FIG. 18 (*a*), if a gesture of bringing the mobile terminal to the corner of user's mouth is inputted in the course of talking on the mobile terminal, the controller 180 may control the microphone 122 to be activated. On the other hand, referring to FIG. 18 (*b*), if a gesture of detaching the mobile terminal from the corner of the user's mouth is inputted in the course of talking on the mobile terminal, the controller 180 may control the microphone 122 to be deactivated.

In particular, a user can adjust an active state of the microphone 122 in a simple manner of lifting or lowering the mobile terminal.

In addition, the controller 180 may handle a voice, which is inputted while the display unit 151 or the bezel is not touched, as a call sound. And, the controller 180 may handle a voice, which is inputted while the display unit 151 or the bezel is touched, as a voice for controlling the mobile terminal 100. In particular, if a user inputs a voice while touching the display unit 151 or the bezel, the controller 180 may send data to a target indicated by the user voice or may record the user voice. If a user inputs a voice while touching the bezel or the display unit 151, the inputted voice is not handled as a call sound. Hence, the inputted voice may not be delivered to a call counterpart.

If a gesture input of bringing the mobile terminal to a user's ear is inputted, the controller 180 may control an audio data, which is converted from a content of an event occurring in the mobile terminal by TTS, to be outputted. In this case, the event occurring in the mobile terminal may include one of a reception of a message, an occurrence of a missed call, an alarm, a schedule, and the like. If the mobile terminal is brought to the user's ear, the controller 180 may control a content of a received message, a content of a missed call, a name of an alarm, a content of a pre-registered schedule, and/or the like to be outputted.

Figure 19:
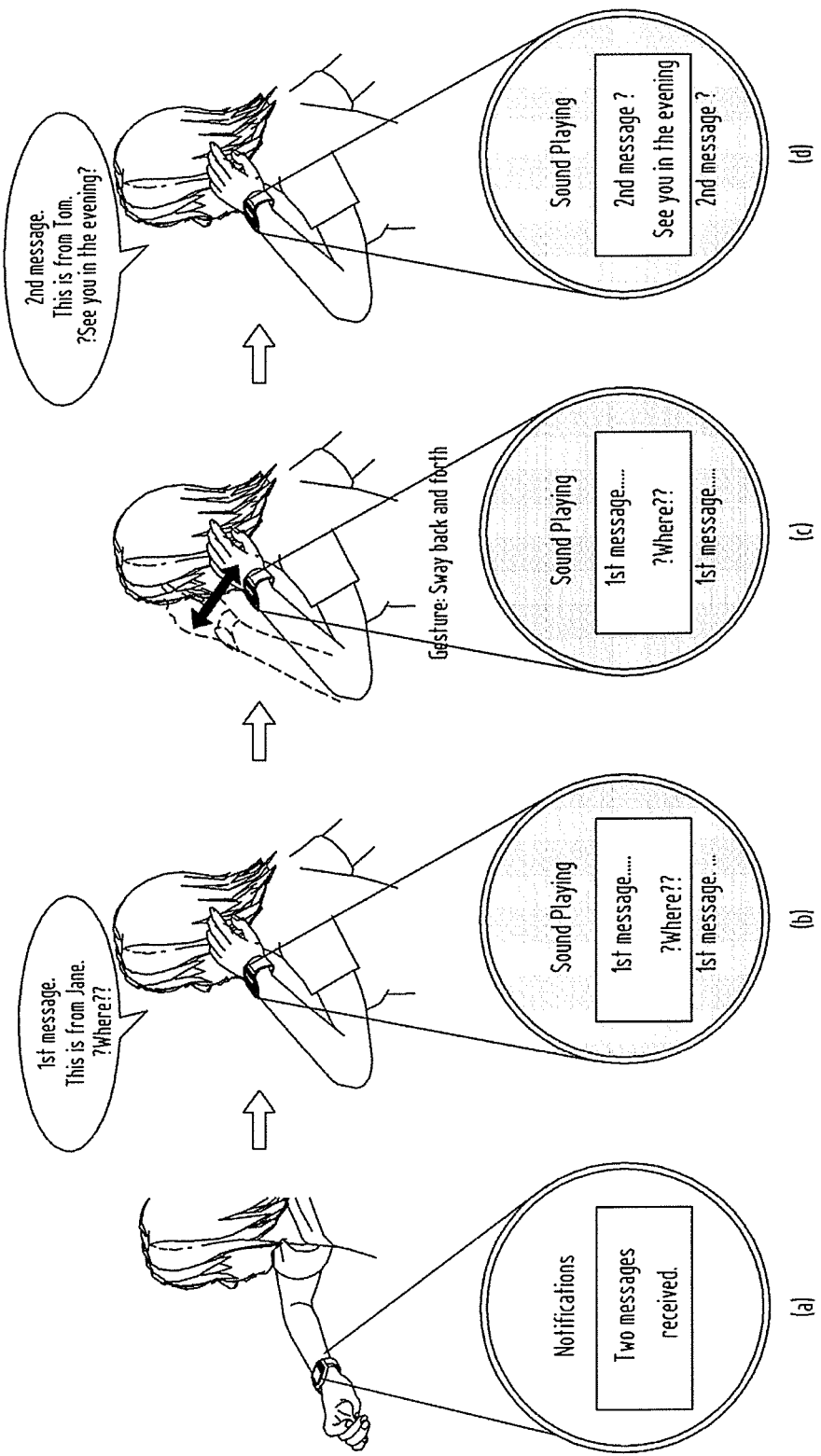
FIG. 19 is a diagram for one example to describe an operation of a mobile terminal in case of holding the mobile terminal to an ear.

For instance, FIG. 19 is a diagram for one example to describe an operation of a mobile terminal in case of holding the mobile terminal to an ear. For clarity of the following description, assume that 2 new messages are received by the mobile terminal [FIG. 19 (*a*)]. If a gesture of bringing the mobile terminal to an ear is inputted, referring to FIG. 19 (*b*), the controller 180 may control information on an event occurring in the mobile terminal to be outputted.

According to the example shown in FIG. 19 (*b*), an information of a person having sent a message and a content of the message are outputted by being converted into a voice.

If a plurality of events occur in the mobile terminal, the controller 180 may control details of an event in next order to be outputted in response to a user's gesture input.

For instance, if a gesture of swaying the mobile terminal placed in the region of a user's ear back and forth is inputted [FIG. 19 (*c*)], the controller 180 can control a voice data, which is converted from a content of a next message by TTS, to be outputted [FIG. 19 (*d*)].

According to the example shown in FIG. 19 (*c*), a gesture input for triggering an output of a next message is a gesture of swaying the mobile terminal back and forth, by which the present disclosure is non-limited. For example, an output of a next message may be triggered by one of various user inputs such as a gesture input of detaching the mobile terminal from a user's ear and then bringing it back to the user's ear, a user's voice command for ordering an output of a next message, and the like.

Moreover, although a user input is not inputted additionally, if an output of a first message is complete, the controller 180 may control an output of a second message to be automatically triggered.

In consideration of a distance between a user and the mobile terminal, the controller 180 can adjust a volume. In particular, the controller 180 can control the volume to decrease as the mobile terminal gets closer to a user's ear.

Figure 20:
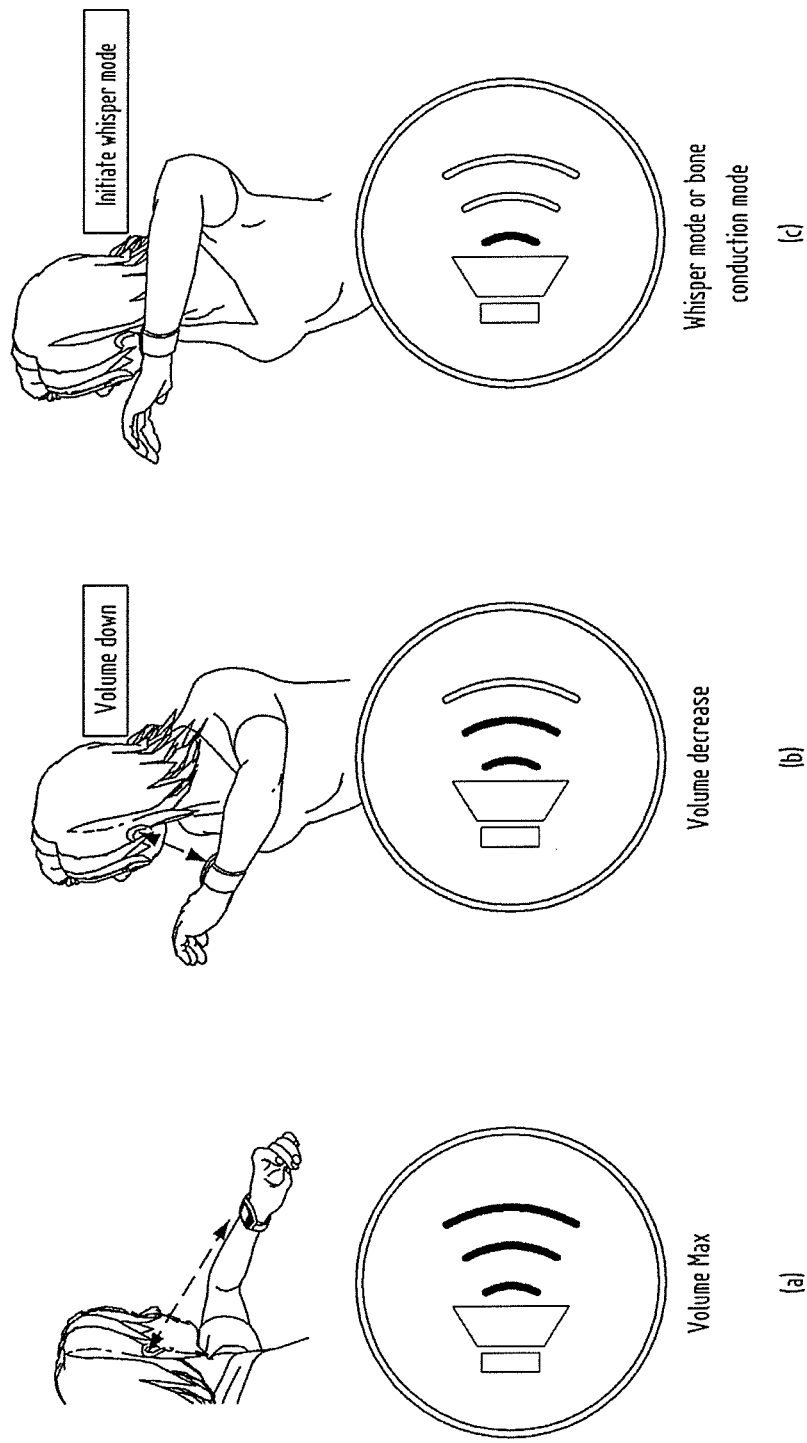
FIG. 20 is a diagram for one example of adjusting a volume of a mobile terminal.

For instance, FIG. 20 is a diagram for one example of adjusting a volume of a mobile terminal.

Referring to FIG. 20 (*a*) and FIG. 20 (*b*), if a gesture input of bringing the mobile terminal to a user's ear is inputted, the controller 180 can control a volume of the mobile terminal to become equal to or lower than a prescribed level. Thereafter, referring to FIG. 20 (*b*) and FIG. 20 (*c*), if the mobile terminal gets further closer to the user's ear, the controller 180 further lowers the volume of the mobile terminal to control a whisper mode or a bone conduction mode to be entered.

In this case, the whisper mode may mean a state that the volume of the mobile terminal becomes equal to or lower than a prescribed level (e.g., a state that the volume is set to a minimum level). And, the bone conduction mode may mean a state that sound is delivered by generating sonic waves.

In doing so, the controller 180 distinguishes a case that the display unit 151 of the mobile terminal gets closer to the user's ear from a case that the band part gets closer to the user's ear. In one of the two cases, the controller 180 can control the mobile terminal to be set to the whisper mode. In the other case, the controller 180 can control the mobile terminal to be set to the bone conduction mode.

For example, referring to FIG. 20 (*c*), in case that the display unit 151 gets closer to the user's ear, the controller 180 can set the mobile terminal to the whisper mode. In case that the band part gets closer to the user's ear, the controller 180 can set the mobile terminal to the bone conduction mode.

The controller 180 may perform a web search using a keyword indicated by a user voice or may make a phone call to a target indicated by a user voice. In doing so, in case that the user inputs a voice by covering the mobile terminal, the controller 180 may control a web search history by the user voice or a call log by the user voice not to be left.

Figure 21:
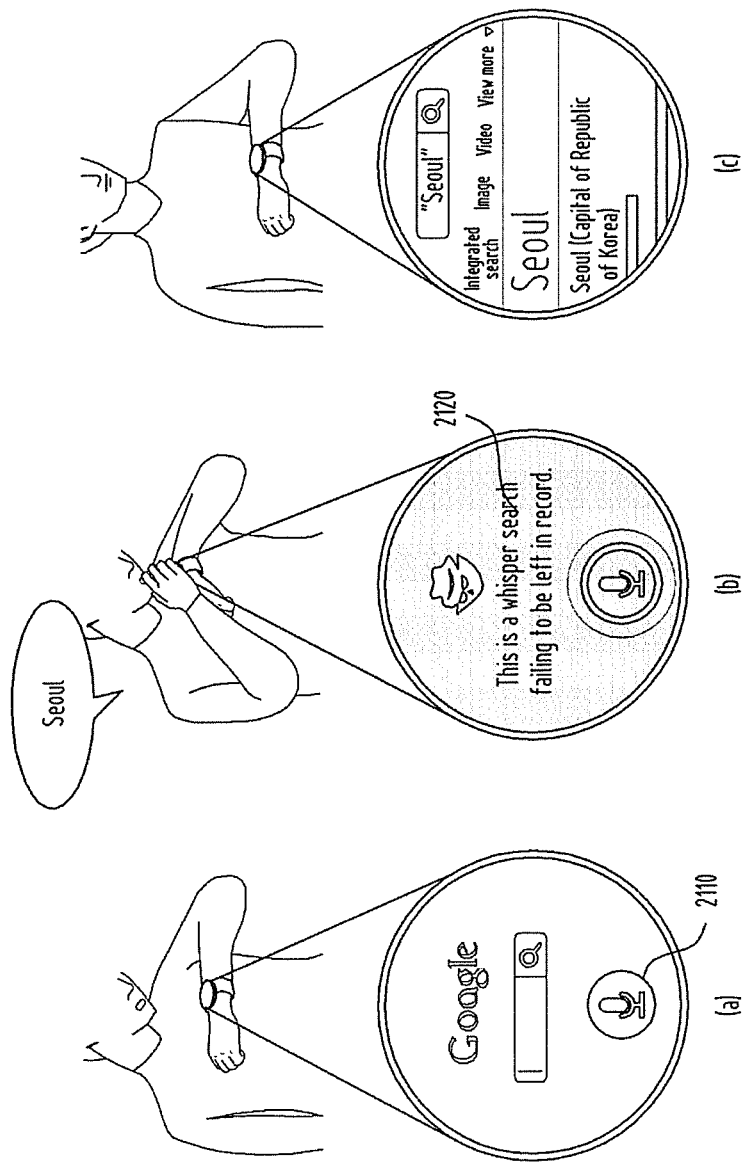
FIG. 21 is a diagram for one example of performing a web search for a keyword indicated by a user voice.

For instance, FIG. 21 is a diagram for one example of performing a web search for a keyword indicated by a user voice.

Referring to FIG. 21, if a user takes a gesture of bringing the mobile terminal to the corner of user's mouth, the controller 180 activates the microphone 122 and is then able to control an indicator 2110, which indicates that the microphone 122 is activated, to be outputted [FIG. 21 (*a*)].

Thereafter, if the user inputs a voice, the controller 180 can perform a web search using a text converting from the user's voice by STT as a keyword. For instance, if the user voice indicates a word 'Seoul' [FIG. 21 (*b*)], the controller 180 can control a web search result for the keyword 'Seoul' to be outputted [FIG. 21 (*c*)].

In doing so, like the example shown in FIG. 21 (*b*), in case that the user inputs a voice by covering the mobile terminal with one hand, the controller 180 can control a web search record for a keyword indicated by the user voice not to be left. In case that the user covers the mobile terminal with one hand, as shown in FIG. 21 (*b*), the controller 180 can output a message 2120 indicating that the search record will not be left.

In this case, like the example shown in FIG. 21 (*b*), the action of covering the mobile terminal may include an action performed in a manner of cupping a hand and then leaving the cupped hand on a lateral side of the mobile terminal. Alternatively, the action of covering the mobile terminal may include an action performed in a manner of covering at least partial region of the display unit 151 or the bezel [not shown in the drawing].

Figure 22:
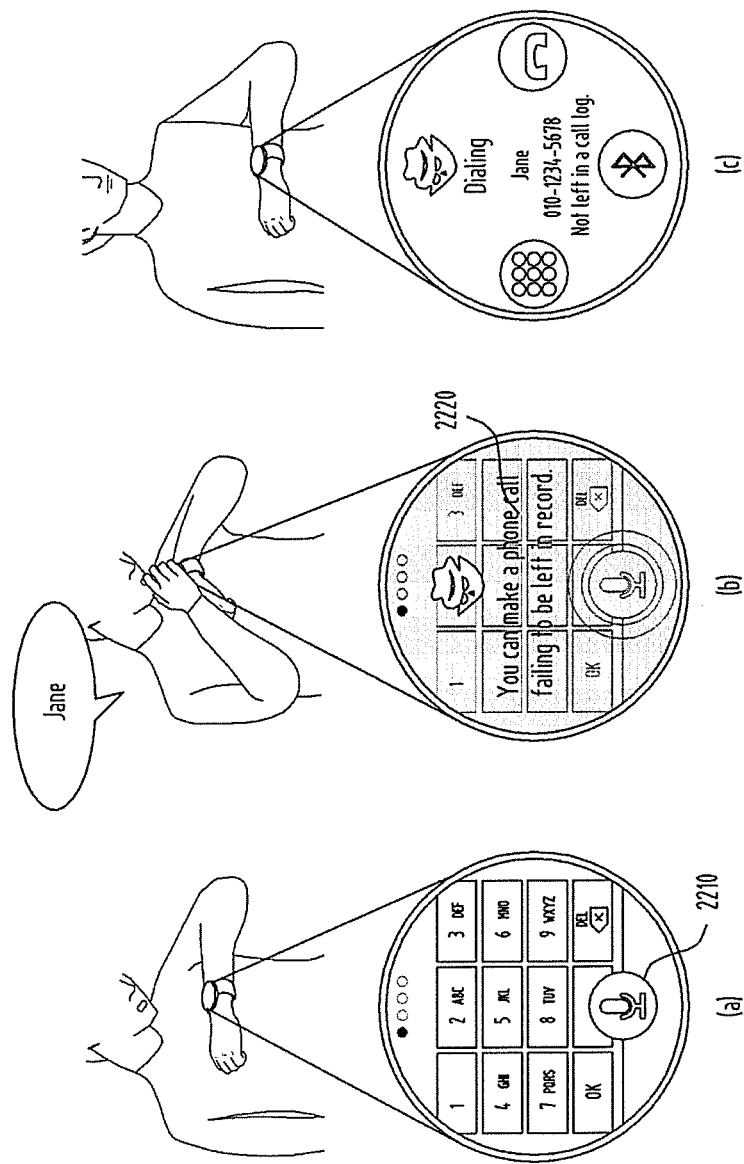
FIG. 22 is a diagram for one example of making a phone call to a target indicated by a user voice.

For another instance, FIG. 22 is a diagram for one example of making a phone call to a target indicated by a user voice.

Referring to FIG. 22, if a user takes a gesture of bringing the mobile terminal to the corner of user's mouth, the controller 180 activates the microphone 122 and is then able to control an indicator 2210, which indicates that the microphone 122 is activated, to be outputted [FIG. 22 (*a*)].

Thereafter, if a user inputs a voice, the controller 180 can make a phone call to a person indicated by a text converting from the user's voice by STT. For example, if the user voice indicates Jane, referring to FIG. 22 (*c*), the controller 180 can make a phone call to Jane.

In doing so, referring to FIG. 22 (*b*), if the user inputs the voice by covering the mobile terminal with one hand, the controller 180 can control a call log to a target indicated by the user voce not to be left. Moreover, if the user covers the mobile terminal with one hand, as shown in FIG. 22 (*b*), the controller 180 can output a message 2220 indicating that the call log will not be left.

Figure 23:
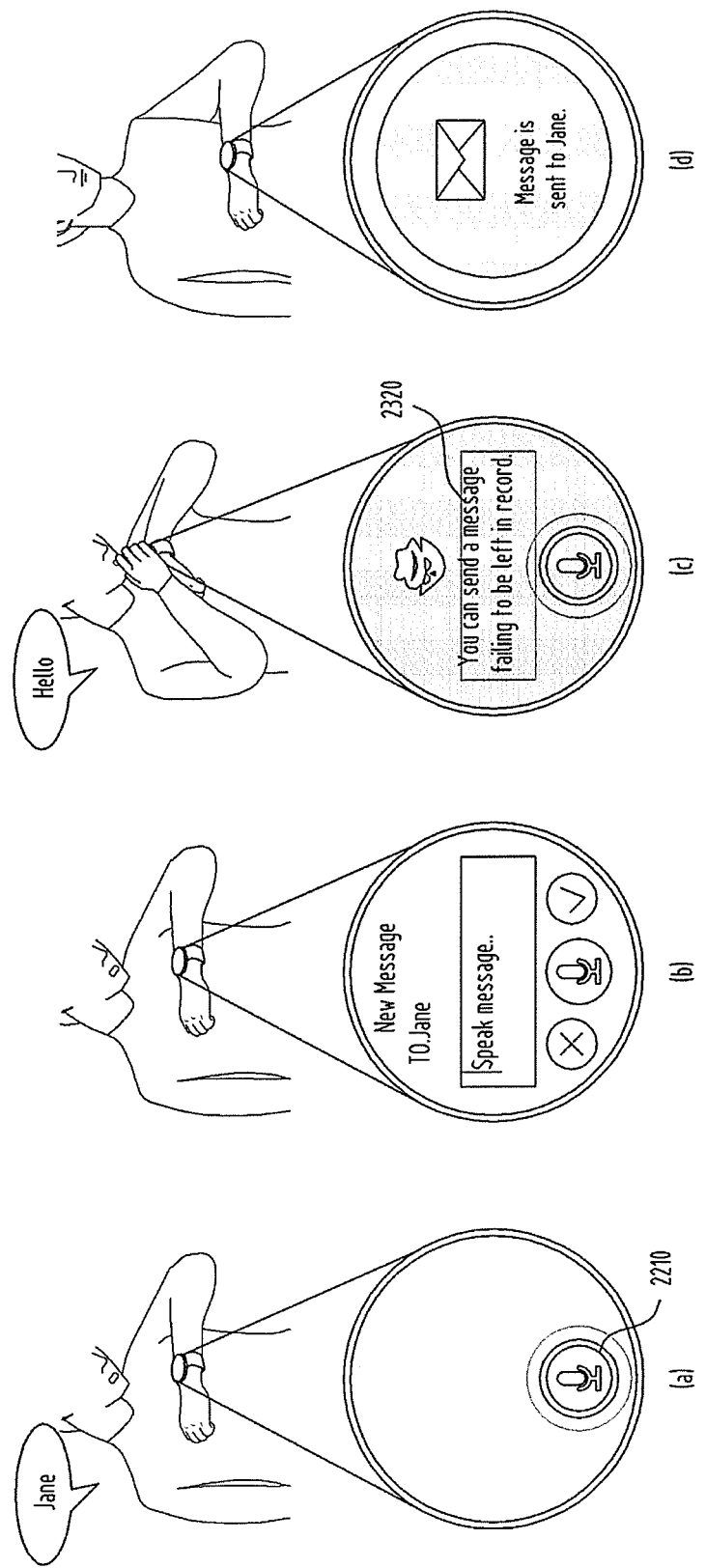
FIG. 23 is a diagram for one example of sending a message by a user voice.

FIG. 23 is a diagram for one example of sending a message by a user voice.

Referring to FIG. 23, if a user takes a gesture of bringing the mobile terminal to the corner of user's mouth, the controller 180 activates the microphone 122 and is then able to control an indicator 2310, which indicates that the microphone 122 is activated, to be outputted [FIG. 23 (a)]. Thereafter, if a user voice indicating a specific person is received, the controller 180 can control a message composing screen, in which the person indicated by the user voice is designated as a recipient, to be outputted. According to the example shown in FIG. 23 (b) and FIG. 23 (c), the message composing screen for composing a message to be sent to 'Jane' who is the person indicated by the user voice is outputted.

Subsequently, if the user inputs a voice, the controller 180 can control a text converting from the user's voice by STT to be inserted in a body of the message. For instance, if the user voice indicates 'Hello', referring to FIG. 23 (d), the controller 180 can control 'Hello' to be inserted in the body of the message.

In doing so, referring to FIG. 23 (c), if the user inputs the voice by covering the mobile terminal with one hand, the controller 180 can control a record of sending the corresponding message not to be left. Moreover, if the user covers the mobile terminal with one hand, as shown in FIG. 23 (c), the controller 180 can output a message 2220 indicating that the message sending record will not be left.

According to the example shown in FIG. 23, when a voice for a message body insertion is inputted, a record of sending a message is not left only if a user covers the mobile terminal with one hand. When a user input for designating a message recipient is applied, if a user covers the mobile terminal with one hand, a record of sending a corresponding message may not be left as well.

Like the examples shown in FIGS. 21 to 23, if a user voice is inputted while the mobile terminal is covered, the controller 180 can control a launch record or a communication record not to be created after launching a function indicated by the user voice or communicating with a target indicated by the user voice. In doing so, the controller 180 may be able to determine whether the user covers the mobile terminal through a sensing signal of the sensing unit 140 or an analysis of an image inputted through the camera.

According to the examples shown in FIGS. 21 to 23, a creation of a use log is cut off by a gesture of covering the mobile terminal. Yet, a gesture input for cutting off a creation of a use log may be non-limited by those examples. In particular, a creation of a use log may be cut off by a gesture input different from those shown in the drawings.

In the examples of FIGS. 21 to 23, different applications are accessed when the user takes a gesture of brining the mobile terminal to the corner of the user's mouth and inputs a voice input. In the example of FIG. 21 the web search interface is displayed, in the example of FIG. 22 the phone interface is displayed, and in the example of FIG. 23 the message composing interface is displayed. The screen which is activated when the user brings the mobile terminal to his or her mouth and inputs a voice input may be controlled in various ways such as being preset based on user settings, based on active applications or events, based on voice commands, or by another appropriate method.

The mobile terminal according to the present disclosure can lock a specific content or a specific application in response to a user's touch input. Once the specific content or application is locked, the user may be able to access the specific content or application only if unlocking the corresponding content or application.

Figure 24:
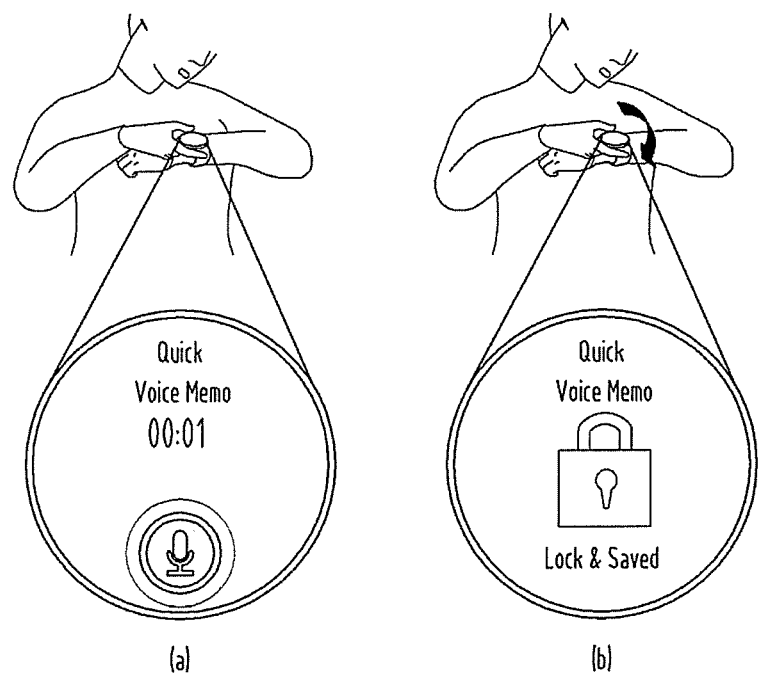
FIG. 24 is a diagram for one example of locking a voice memo.

For instance, FIG. 24 is a diagram for one example of locking a voice memo.

Referring to FIG. 24, if a user takes a gesture of lifting the mobile terminal to the corner of user's mouth and touches the bezel, the controller 180 can start a voice recording of recording sound inputted through the microphone [FIG. 24 (a)].

While the user voice is recorded, if a preset touch input is received from the user, the controller 180 stops the voice recording and is able to control a created voice recording file to be locked. For example, if a touch input of rotating two pointers currently touching the bezel clockwise is received [FIG. 24 (b)], the controller 180 can control a voice recording file to be locked [FIG. 24 (b)].

Thereafter, the controller 180 may be able to play the voice recording file only if unlocking the locked voice recording file.

Besides, a photo, a music file, a video, a schedule, a contact, a message and the like can be locked as well as a voice recording file.

Figure 25:
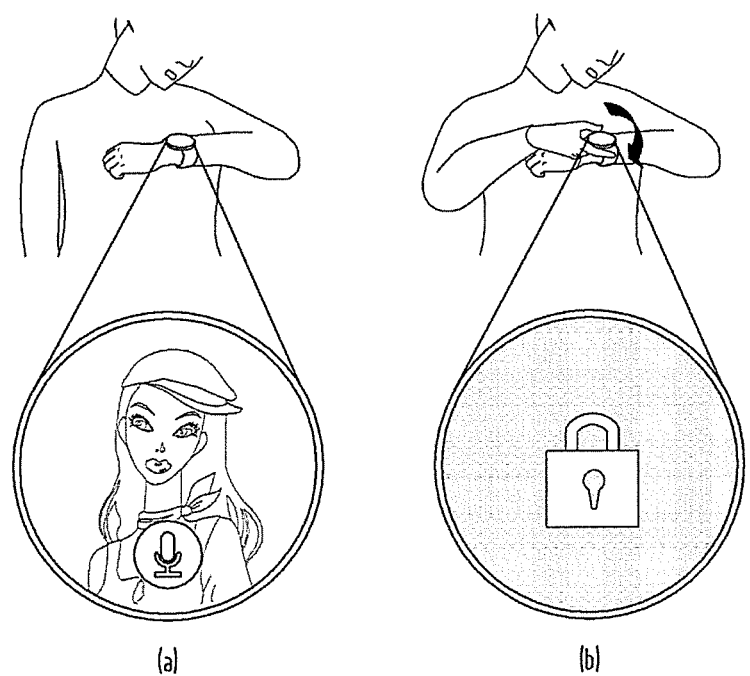
FIG. 25 is a diagram for one example of locking a photo.

For instance, FIG. 25 is a diagram for one example of locking a photo.

Referring to FIG. 25, while a photo is outputted through the display unit 151, if a preset touch input is received, the controller 180 can control the displayed photo to be locked. For example, while a photo is displayed [FIG. 25 (a)], if a touch input of rotating two pointers currently touching the bezel clockwise is received, the controller 180 can control the displayed photo to be locked [FIG. 25 (b)].

Thereafter, only if the locked photo is unlocked, the controller 180 may be able to output a locked photo file.

According to the examples shown in FIG. 24 and FIG. 25, an individual data saved in the mobile terminal can be locked. Additionally, the controller 180 can lock an application installed on the mobile terminal.

For instance, FIG. 26 is a diagram for one example of locking a specific application.

Referring to FIG. 26, while a specific application is run, if a preset touch input is received, the controller 180 stops running the application (e.g., returns to a background state) and is able to lock the application. For instance, if an icon named 'Health Care' is touched [FIG. 26 (a)], the controller 180 can run an application 'Health Care'. While the healthcare application is run, as shown in FIG. 26 (b), if a touch input of rotating two pointers currently touching the bezel clockwise is received, the controller 180 stops running the application and is able to control the corresponding application to be locked. In doing so, the controller 180 may control an indicator 2610, which indicates that the corresponding application is in locked state, to be outputted on the icon of the locked application.

Thereafter, only if the locked application is unlocked, the controller 180 may run the locked application.

If a user input for desiring to access a locked data or a locked application is received, the controller 180 may control an unlock screen, which is provided to unlock, to be outputted. If a password (e.g., PIN code, pattern password, etc.) for the unlock is set, an object for inputting the password may be included in a lock screen. In this case, the controller 180 may unlock the data or application by verifying accuracy of a password inputted by a user.

If the password for the unlock is not set, the controller 180 may release the lock in response to a preset touch input. For instance, in response to a touch input of rotating two pointers currently touching the bezel counterclockwise, the controller 180 can unlock the data or application.

According to the above example described in detail, an action of rotating two pointers currently touching the bezel clockwise is taken as one example of a touch input for a lock, while an action of rotating two pointers currently touching the bezel counterclockwise is taken as one example of a touch input for an unlock. The above-mentioned touch inputs are exemplarily provided for clarity of the description only, by which the present disclosure is non-limited. Moreover, a lock or unlock may be achieved by a touch input to the display unit 151 as well as to the bezel region.

According to the examples mentioned in the foregoing description, only if a preset gesture (e.g., a gesture for a user to lift the mobile terminal to the corner of the user's mouth) is received, the microphone 122 is activated to enable a state for a user to input a voice. Yet, while a user is driving a car or holding things with both hands, it may be difficult for the user to take a gesture of lifting the mobile terminal to the corner of the user's mouth. Hence, if the controller 180 determines that the user is driving a car or the user holds a thing with a hand having the mobile terminal worn thereon, the controller 180 activates the microphone 122 to control a state, in which a voice can be listened to at any time, to be enabled.

Yet, in order to prevent malfunction of the mobile terminal, the controller 180 may control a voice command function not to be initiated until a preset text is received. For instance, if a preset phrase is 'Ok Watch', the controller 180 ignores user voices until the phrase 'Ok Watch' is received. If the phrase 'Ok Watch' is received, the controller 180 can start to process the user voice. After the voice command function has been launched, if any user voice is not received for a prescribed time, the controller 180 may control the voice command function to be disabled automatically.

In doing so, the controller 180 may detect whether the user is driving a car based on a moving speed of the mobile terminal. Alternatively, the controller 180 may detect whether the user is holding a thing based on the muscle movement in a wrist on which the mobile terminal is worn. In doing so, the moving speed of the mobile terminal may be measured by GPS or the like. And, the muscle movement in the wrist may be sensed through the sensing unit 140.

Although the above embodiments mentioned in the foregoing description are described with reference to a mobile terminal of a watch type, they are not necessarily applicable to the mobile terminal of the watch type only. And, the present disclosure is applicable to other wearable devices (e.g., a necklace type device, a ring type device, a glasses type device, etc.) as well as to the watch type mobile terminal. Moreover, the present disclosure is applicable to no-wearable devices (e.g., a smartphone, a tablet PC, an MP3 player, etc.).

Accordingly, embodiments of the present disclosure provide various effects and/or features.

First of all, the present disclosure provides a mobile terminal and controlling method thereof, by which user's convenience can be enhanced.

In particular, the present disclosure provides a watch type mobile terminal and controlling method thereof, by which the watch type mobile terminal can be controlled through voice.

Moreover, the present disclosure provides a mobile terminal and controlling method thereof, by which a different function can be executed depending on whether a display unit is touched in case of inputting voice.

It will be appreciated by those skilled in the art that the present disclosure can be specified into other form(s) without departing from the spirit or scope of the disclosures.

In addition, the above-described methods can be implemented in a program recorded medium as processor-readable codes. The processor-readable media may include all kinds of recording devices in which data readable by a processor are stored. The processor-readable media may include ROM, RAM, CD-ROM, magnetic tapes, floppy discs, optical data storage devices, and the like for example and also include carrier-wave type implementations (e.g., transmission via Internet).

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this invention. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal having a watch type configuration, comprising:
    a touch input unit configured to receive touch inputs;
    a wireless communication unit configured to perform wireless communication;
    a sensing unit configured to sense a movement of the mobile terminal;
    a microphone configured to receive a sound; and
    a controller is configured to:
    activate the microphone when a preset first gesture input is detected through the sensing unit,
    when a user voice is received via the microphone while the touch input unit is touched, control data to be transmitted to a target indicated by the user voice through the wireless communication unit,
    when the user voice is received via the microphone while the touch input unit is not touched, control a function indicated by the user voice to be executed on the mobile terminal, and
    when a preset second gesture input is detected after receiving the user voice, the received user voice is canceled.

2. The mobile terminal of claim 1, wherein when the user voice is received while the touch input unit is touched, the controller is configured to control data selected by the touch to be transmitted to the target.

3. The mobile terminal of claim 1, wherein when the user voice is received while the touch input unit is touched, the controller is configured to control a content currently outputted through the mobile terminal to be transmitted to the target.

4. The mobile terminal of claim 3, wherein when the user voice is received while a photo content is outputted through a display unit, the controller is configured to control the photo content to be transmitted to a person in the photo content as indicated by the user voice.

5. The mobile terminal of claim 1, wherein when the user voice is received while the touch input unit is touched, the controller is configured to control a capture image that includes at least portion of a screen outputted via a display unit to be transmitted to the target.

6. The mobile terminal of claim 1, wherein the touch input unit includes a display unit configured to display information and a bezel surrounding the display unit, and
   wherein when the user voice is received while either the display unit or the bezel is touched, the controller is configured to control the data to be transmitted to the target indicated by the user voice.

7. The mobile terminal of claim 6, wherein when either the bezel or the display unit is touched, the controller is configured to control a recording of sound using the microphone to be started.

8. The mobile terminal of claim 7, wherein when a preset touch input is received through the touch input unit, the controller is configured to finish the recording and control a recording file created from the recording to be locked.

9. The mobile terminal of claim 8, wherein when a touch input to access the recording file in a locked state is received, the controller is configured to control an unlock screen for unlocking the recording file to be outputted.

10. The mobile terminal of claim 7, wherein while the recording is in progress, the controller is configured to control a text converted from the user voice by STT (Speech to Text) to be outputted.

11. The mobile terminal of claim 1, wherein when a distance between the mobile terminal and the user is greater than or equal to a prescribed distance after receiving the first gesture input, the controller is configured to control to output through a display unit a text converted from the user voice by SIT, and wherein when the distance between the mobile terminal and the user is less than the prescribed distance, the controller is configured to omit output of the text through the display unit.

12. The mobile terminal of claim 1, wherein the controller is configured to:
   when a preset third gesture input is detected before receiving the user voice, deactivate the microphone.

13. The mobile terminal of claim 1, wherein the controller is configured to:
   regard the received user voice as a verbal command when the user voice is received while the touch input unit is not touched, and
   record the received user voice or use the received user voice in determining the target to send the data when the user voice is received while the touch input unit is touched.

14. The mobile terminal of claim 1, wherein when a gesture input of brining the mobile terminal to a user's ear is detected, the controller is configured to output information of an event occurring in the mobile terminal as sound data.

15. The mobile terminal of claim 14, wherein the controller is further configured to control a volume to be decreased as the mobile terminal is moved closer to the user's ear.

16. The mobile terminal of claim 14, wherein when a preset second gesture is detected while the sound data of the event information being outputted, the controller is further configured to control the information of another event that is next in order to be outputted as the sound data.

17. The mobile terminal of claim 1, wherein when the user voice is received while the touch input unit is not touched, the controller is configured to perform a web search using a keyword indicated by the user voice.

18. The mobile terminal of claim 17, wherein when the user inputs the user voice while making a gesture to cover a portion of the mobile terminal, the controller is configured to prevent a history of the web search from being recorded.

19. The mobile terminal of claim 1, wherein when the user voice is received while the touch input unit is not touched, the controller is configured to initiate a phone call to a person indicated by the user voice, and wherein the controller is configured to control the microphone to be active while the preset first gesture is held during the phone call.

20. A method of controlling a mobile terminal having a watch type configuration, comprising:
   activating, by a controller, a microphone when a preset first gesture input is detected;
   receiving a user voice through the microphone after the preset first gesture input is detected;
   when the user voice is received while a touch input unit is touched, transmitting data indicated by the user voice to a target indicated by the user voice;
   when the user voice is received while the touch input unit is not touched, executing a function indicated by the user voice, and
   when a reset second gesture input is detected after receiving the user voice, the received user voice is canceled.

* * * * *